(12) United States Patent
Redden et al.

(10) Patent No.: US 11,510,404 B2
(45) Date of Patent: Nov. 29, 2022

(54) BOOM SPRAYER INCLUDING MACHINE FEEDBACK CONTROL

(71) Applicant: Blue River Technology Inc., Sunnyvale, CA (US)

(72) Inventors: Lee Kamp Redden, Palo Alto, CA (US); Erik Ehn, Sunnyvale, CA (US); James Michael Fleming, San Francisco, CA (US)

(73) Assignee: BLUE RIVER TECHNOLOGY INC., Sunnyvale, CA (US)

( * ) Notice: Subject to any disclaimer, the term of this patent is extended or adjusted under 35 U.S.C. 154(b) by 845 days.

(21) Appl. No.: 16/420,169

(22) Filed: May 23, 2019

(65) Prior Publication Data

US 2019/0357520 A1 Nov. 28, 2019

Related U.S. Application Data

(60) Provisional application No. 62/676,257, filed on May 24, 2018.

(51) Int. Cl.
*G06F 7/70* (2006.01)
*A01M 7/00* (2006.01)
(Continued)

(52) U.S. Cl.
CPC .......... *A01M 7/0057* (2013.01); *G05B 13/027* (2013.01); *G05B 13/042* (2013.01);
(Continued)

(58) Field of Classification Search
CPC ...... G08G 1/0145; B05B 1/20; B05B 12/124; H04N 7/183; G06Q 50/02; A01M 7/0057;
(Continued)

(56) References Cited

U.S. PATENT DOCUMENTS 5,337,959 A 8/1994 Boyd
5,348,226 A 9/1994 Heiniger et al.
(Continued)

FOREIGN PATENT DOCUMENTS

GB 2521343 A 6/2015
JP H06176179 A 6/1994

OTHER PUBLICATIONS

Streichert et al, CN 102859158, translation of "Controlling Device and Method for Outputting Parameter for Calculating Control", Jan. 2, 2013, 11 pgs <CN_102859158.pdf>.*
(Continued)

*Primary Examiner* — Tuan A Vu
(74) *Attorney, Agent, or Firm* — Fenwick & West LLP

(57) ABSTRACT

A boom sprayer includes any number of components to treat plants as the boom sprayer travels through a plant field. The components take actions to treat plants or facilitate treating plants. The boom sprayer includes any number of sensors to measure the state of the boom sprayer as the boom sprayer treats plants. The boom sprayer includes a control system to generate actions for the components to treat plants in the field. The control system includes an agent executing a model that functions to improve the performance of the boom sprayer treating plants. Performance improvement can be measured by the sensors of the boom sprayer. The model is an artificial neural network that receives measurements as inputs and generates actions that improve performance as outputs. The artificial neural network is trained using actor-critic reinforcement learning techniques.

23 Claims, 12 Drawing Sheets

(51) Int. Cl.
*G05B 13/02* (2006.01)
*G05B 13/04* (2006.01)
*G05B 17/02* (2006.01)
*G05B 19/05* (2006.01)
*G06G 7/00* (2006.01)

(52) U.S. Cl.
CPC ........... *G05B 13/048* (2013.01); *G05B 17/02* (2013.01); *G05B 19/054* (2013.01); *A01M 7/0042* (2013.01); *A01M 7/0089* (2013.01); *G06F 7/70* (2013.01); *G06G 7/00* (2013.01)

(58) Field of Classification Search
CPC .... A01M 7/0042; A01M 7/0089; G01W 1/10; G06F 7/70; G06G 7/00
See application file for complete search history.

(56) References Cited

U.S. PATENT DOCUMENTS

| | | | |
|---|---|---|---|
| 5,485,545 A | | 1/1996 | Kojima et al. |
| 5,704,546 A | | 1/1998 | Henderson et al. |
| 10,255,670 B1 | * | 4/2019 | Wu .................... H04N 7/183 |
| 2003/0014171 A1 | | 1/2003 | Ma et al. |
| 2003/0220740 A1 | * | 11/2003 | Intriligator .............. G01W 1/10 702/3 |
| 2009/0112372 A1 | | 4/2009 | Peterson |
| 2011/0266365 A1 | | 11/2011 | Hrnicek et al. |
| 2015/0027040 A1 | | 1/2015 | Redden |
| 2015/0367358 A1 | * | 12/2015 | Funseth .............. A01M 7/0089 239/562 |
| 2016/0136671 A1 | | 5/2016 | Kocer et al. |
| 2016/0255778 A1 | | 9/2016 | Redden et al. |
| 2016/0368011 A1 | * | 12/2016 | Feldhaus ............... B05B 12/124 |
| 2017/0351790 A1 | * | 12/2017 | Farah .................... G06Q 50/02 |
| 2018/0054983 A1 | * | 3/2018 | Hanna ....................... B05B 1/20 |
| 2018/0271015 A1 | | 9/2018 | Redden et al. |
| 2019/0329782 A1 | * | 10/2019 | Shalev-Shwartz ... G08G 1/0145 |

OTHER PUBLICATIONS

Zhang et al, CN 105230224 (translation of "An Intelligent Mower and Weed Removing Method Thereof", Mar. 22, 2017, 11 pgs <CN_105230224.pdf>.*

PCT International Search Report and Written Opinion, PCT Application No. PCT/US19/33701, dated Aug. 12, 2019, ten pages.

Nachum et al. "Bridging the Gap Between Value and Policy Based Reinforcement Learning." Cornell University Library, Feb. 28, 2017, pp. 1-11.

European Patent Office, Extended European Search Report, European Patent Application No. 19807275.3, dated Feb. 9, 2022, six pages.

* cited by examiner

1. Initialization
   $V(s) \in \Re$ and $\pi(s) \in \mathcal{A}(s)$ arbitrarily for all $s \in \mathcal{S}$ 2. Policy Evaluation
   Repeat
     $\Delta \leftarrow 0$
     For each $s \in \mathcal{S}$:
       $v \leftarrow V(s)$
       $V(s) \leftarrow \sum_{s'} \mathcal{P}_{ss'}^{\pi(s)} \left[ \mathcal{R}_{ss'}^{\pi(s)} + \gamma V(s') \right]$
       $\Delta \leftarrow \max(\Delta, |v - V(s)|)$
   until $\Delta < \theta$ (a small positive number)

3. Policy Improvement
   $policy\text{-}stable \leftarrow true$
   For each $s \in \mathcal{S}$:
     $b \leftarrow \pi(s)$
     $\pi(s) \leftarrow \arg\max_a \sum_{s'} \mathcal{P}_{ss'}^a \left[ \mathcal{R}_{ss'}^a + \gamma V(s') \right]$
     If $b \neq \pi(s)$, then $policy\text{-}stable \leftarrow false$
   If $policy\text{-}stable$, then stop; else go to 2

FIG. 5A

Initialize $V$ arbitrarily, e.g., $V(s) = 0$, for all $s \in \mathcal{S}^+$

Repeat
  $\Delta \leftarrow 0$
  For each $s \in \mathcal{S}$:
    $v \leftarrow V(s)$
    $V(s) \leftarrow \max_a \sum_{s'} \mathcal{P}_{ss'}^a \left[ \mathcal{R}_{ss'}^a + \gamma V(s') \right]$
    $\Delta \leftarrow \max(\Delta, |v - V(s)|)$
until $\Delta < \theta$ (a small positive number)

Output a deterministic policy, $\pi$, such that
  $\pi(s) = \arg\max_a \sum_{s'} \mathcal{P}_{ss'}^a \left[ \mathcal{R}_{ss'}^a + \gamma V(s') \right]$

FIG. 5B

Initialize $V(s)$ arbitrarily, $\pi$ to the policy to be evaluated
Repeat (for each episode):
   Initialize $s$
   Repeat (for each step of episode):
      $a \leftarrow$ action given by $\pi$ for $s$
      Take action $a$; observe reward, $r$, and next state, $s'$
      $V(s) \leftarrow V(s) + \alpha[r + \gamma V(s') - V(s)]$
      $s \leftarrow s'$
   until $s$ is terminal

FIG. 5C

Initialize $Q(s,a)$ arbitrarily
Repeat (for each episode):
   Initialize $s$
   Repeat (for each step of episode):
      Choose $a$ from $s$ using policy derived from $Q$ (e.g., $\varepsilon$-greedy)
      Take action $a$, observe $r$, $s'$
      $Q(s,a) \leftarrow Q(s,a) + \alpha[r + \gamma \max_{a'} Q(s',a') - Q(s,a)]$
      $s \leftarrow s'$;
   until $s$ is terminal

FIG. 5D

For a continuous-time linear system described by $$\dot{x} = Ax + Bu$$

with a cost functional defined as $$J = \int_0^\infty \left(x^T Q x + u^T R u + 2 x^T N u\right) dt$$

the feedback control law that minimizes the value of the cost is $$u = -Kx$$

where $K$ is given by $$K = R^{-1}(B^T P + N^T)$$

and $P$ is found by solving the continuous time algebraic Riccati equation $$A^T P + PA - (PB + N)R^{-1}(B^T P + N^T) + Q = 0$$

This can be also written as $$\mathcal{A}^T P + P\mathcal{A} - PBR^{-1}B^T P + \mathcal{Q} = 0$$

with $$\mathcal{A} = A - BR^{-1}N^T \qquad \mathcal{Q} = Q - NR^{-1}N^T$$

FIG. 5F

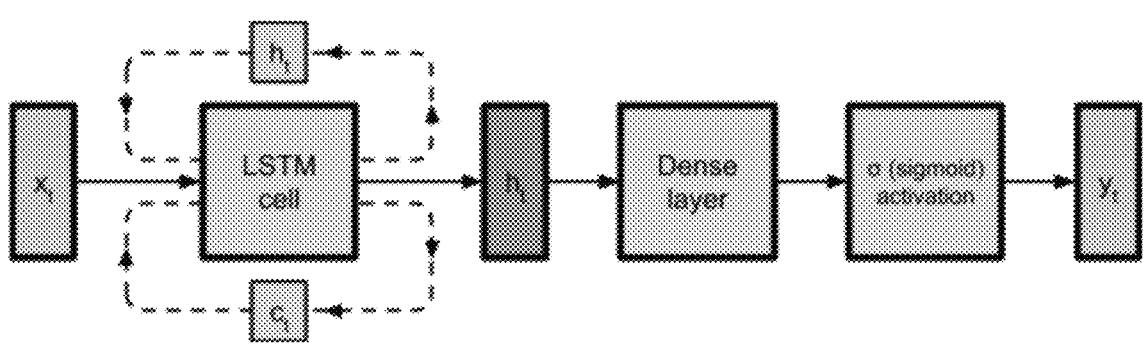

FIG. 5G

BOOM SPRAYER INCLUDING MACHINE FEEDBACK CONTROL

CROSS-REFERENCE TO RELATED APPLICATION

This application claims the benefit of U.S. Provisional Application No. 62/676,257 filed May 24, 2018, the contents of which are hereby incorporated in reference in their entirety.

FIELD OF DISCLOSURE

This application relates to a system for controlling a boom sprayer in a plant field, and more specifically to controlling the boom sprayer using reinforcement learning methods.

DESCRIPTION OF THE RELATED ART

Traditionally, boom sprayers are manually operated vehicles where machine includes manual or digital inputs allowing the operator to control the various settings of the boom sprayer. 3More recently, machine optimization programs have been introduced that purport to reduce the need for operator input. However, even these algorithms fail to account for a wide variety of machine and field conditions, and thus still require a significant amount of operator input. In some machines, the operator determines which machine performance parameter is unsatisfactory (sub-optimal or not acceptable) and then manually steps through a machine optimization program using various control techniques. This process takes considerable time and requires significant operator interaction and knowledge. Further, it prevents the operator from monitoring the field operations and being aware of his surroundings while he is interacting with the machine. Thus, a boom sprayer that will improve or maintain the performance of the boom sprayer with less operator interaction and distraction is desirable.

SUMMARY

A boom sprayer can include any number of components to treat (e.g., spray) plants as the boom sprayer travels through a plant field. A component, or a combination of components, can take an action to treat plants in the field or an action that facilitates the boom sprayer treating plants in the field. Each component is coupled to an actuator that actuates the component to take an action. Each actuator is controlled by an input controller that is communicatively coupled to a control system for the boom sprayer. The control system sends actions, as machine commands, to the input controllers which causes the actuators to actuate their components. Thus, the control system generates actions that cause components of the boom sprayer to treat plants in the plant field.

The boom sprayer can also include any number of sensors to take measurements of a state of the boom sprayer. The sensors are communicatively coupled to the control system. A measurement of the state generates data representing a configuration or a capability of the boom sprayer. A configuration of the boom sprayer is the current setting, speed, separation, position, etc. of a component of the machine. A capability of the machine is a result of a component action as the boom sprayer treats plants in the plant field. Thus, the control system receives measurements about the boom sprayer state as the boom sprayer treats plants in the field.

The control system can include an agent that generates actions for the components of the boom sprayer that improves boom sprayer performance. Improved performance can include a quantification of various metrics of treating plants using the boom sprayer including the distance between a boom assembly and a plant, the distance between a boom assembly and the ground, an amount of treated plants, a quality of treatments applied to plants, etc. Performance can be measured using any of the sensors of the boom sprayer.

The agent can include a model that receives measurements from the boom sprayer as inputs and generates actions predicted to improve performance as an output. In one example, the model is an artificial neural network (ANN) including a number of input neural units in an input layer and a number of output neural units in an output layer. Each neural unit of the input layer is connected by a weighted connection to any number of output neural units of the output layer. The neural units and weighted connections in the ANN represent the function of generating an action to improve boom sprayer performance from a measurement. The weighted connections in the ANN are trained using an actor-critic reinforcement learning model.

BRIEF DESCRIPTION OF DRAWINGS

FIG. 5A-5G are illustrations of a reinforcement learning system, according to one embodiment.

The figures depict embodiments for purposes of illustration only. One skilled in the art will readily recognize from the following description that alternative embodiments of the structures and methods illustrated herein may be employed without departing from the principles of the invention described herein.

DETAILED DESCRIPTION

I. Introduction

Farming machines that affect (manipulate) plants in a field have continued to improve over time. Farming machines can include a multitude of components for accomplishing the task of treating plants in a field. They can further include any number of sensors that take measurements to monitor the performance of a component, a group of components, or a state of a component. Traditionally, measurements are reported to the operator and the operator can manually make changes to the configuration of the components of the farming machine to improve the performance. However, as the complexity of the farming machines has increased, it has become increasingly difficult for an operator to understand how a single change in a component affects the overall performance of the farming machine. Similarly, classical optical control models that automatically adjust machine components are unviable because the various processes for accomplishing the machines task are nonlinear and highly complex such that the machines system dynamics are unknown.

Described herein is a farming machine that employs a machine learned model that automatically determines, in real-time, actions to affect components of the machine to improve performance of the machine. In one example, the machine learned model is trained using a reinforcement learning technique. Models trained using reinforcement learning excel at recognizing patterns in large interconnected data structures, herein applied to the measurements from a farming machine, without the input of an operator. The model can generate actions for the farming machine that are predicted to improve the performance of the machine based on those recognized patterns. In another example, the machine learned model is trained using other model based machine learning techniques (e.g., a forward dynamics model). The model can also generate actions for the farming machine that are predicted to improve performance of the machine. Accordingly, a farming machine is described that executes a which allows the farming machine to operate more efficiently with less input from the operator. Among other benefits, this helps reduce operator fatigue and distraction, for example in the case where the operator is also driving the farming machine.

II. Plant Manipulation Machine

Figure 1A:
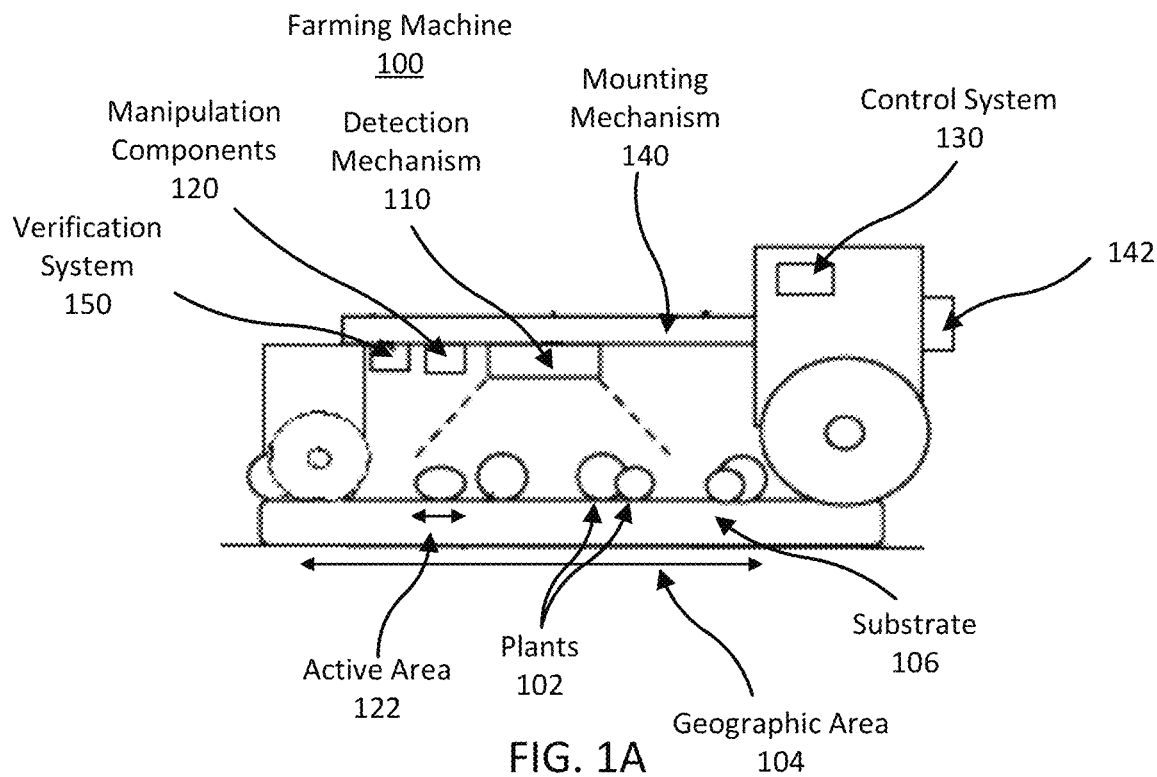
FIGS. 1A and 1B are illustrations of a machine for manipulating plants in a field, according to one example.
Figure 1B:
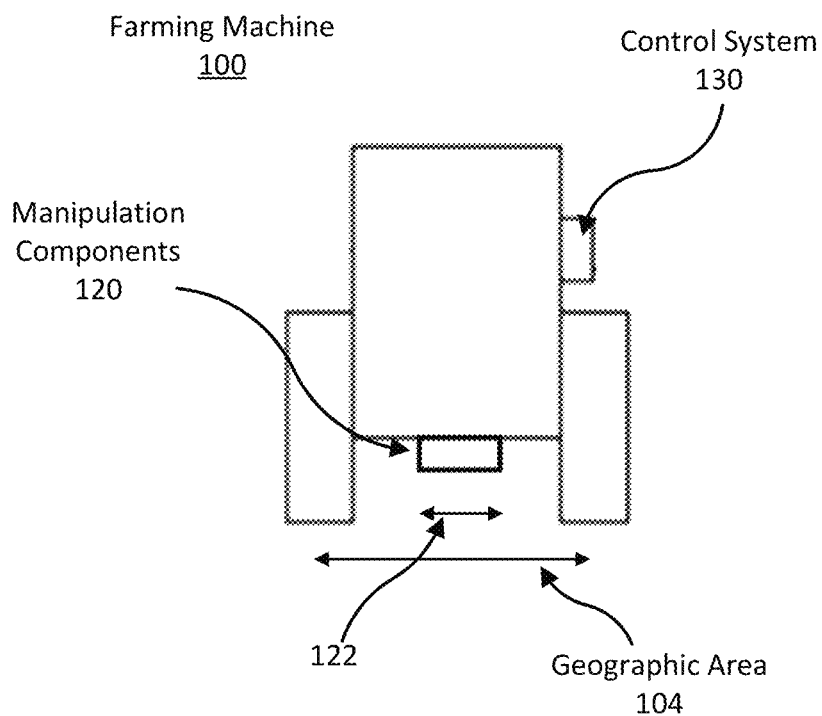

FIG. 1 is an illustration of a machine for manipulating plants in a field, according to one example embodiment. While the illustrated machine 100 is akin to a tractor pulling a farming implement, the system can be any sort of system for manipulating plants 102 in a field. For example, the system can be a combine harvester, a crop thinner, a seeder, a planter, a boom sprayer, etc. The machine 100 for plant manipulation can include any number of detection mechanisms 110, manipulation components 120 (components), and control systems 130. The machine 100 can additionally include any number of mounting mechanisms 140, verification systems 150, power sources, digital memory, communication apparatus, or any other suitable components.

The machine 100 functions to manipulate one or multiple plants 102 within a geographic area 104. In various configurations, the machine 100 manipulates the plants 102 to regulate growth, treat some portion of the plant, treat a plant with a fluid, monitor the plant, terminate plant growth, remove a plant from the environment, or any other type of plant manipulation. Often, the machine 100 directly manipulates a single plant 102 with a component 120, but can also manipulate multiple plants 102, indirectly manipulate one or more plants 102 in proximity to the machine 100, etc. Additionally, the machine 100 can manipulate a portion of a single plant 102 rather than a whole plant 102. For example, in various embodiments, the machine 100 can prune a single leaf off a large plant, or can remove an entire plant from the soil. In other configurations, the machine 100 can manipulate the environment of plants 102 with various components 120. For example, the machine 100 can remove soil to plant new plants within the geographic area 104, remove unwanted objects from the soil in the geographic area 104, etc.

The plants 102 can be crops, but can alternatively be weeds or any other suitable plant. The crop may be cotton, but can alternatively be lettuce, soy beans, rice, carrots, tomatoes, corn, broccoli, cabbage, potatoes, wheat or any other suitable commercial crop. The plant field in which the machine is used is an outdoor plant field, but can alternatively be plants 102 within a greenhouse, a laboratory, a grow house, a set of containers, a machine, or any other suitable environment. The plants 102 can be grown in one or more plant rows (e.g., plant beds), wherein the plant rows are parallel, but can alternatively be grown in a set of plant pots, wherein the plant pots can be ordered into rows or matrices or be randomly distributed, or be grown in any other suitable configuration. The plant rows are generally spaced between 2 inches and 45 inches apart (e.g. as determined from the longitudinal row axis), but can alternatively be spaced any suitable distance apart, or have variable spacing between multiple rows. In other configurations, the plants are not grown in rows.

The plants 102 within each plant field, plant row, or plant field subdivision generally includes the same type of crop (e.g. same genus, same species, etc.), but can alternatively include multiple crops or plants (e.g., a first and a second plant), both of which can be independently manipulated. Each plant 102 can include a stem, arranged superior (e.g., above) the substrate, which supports the branches, leaves, and fruits of the plant. Each plant 102 can additionally include a root system joined to the stem, located inferior the substrate plane (e.g., below ground), that supports the plant position and absorbs nutrients and water from the substrate 106. The plant can be a vascular plant, non-vascular plant, ligneous plant, herbaceous plant, or be any suitable type of plant. The plant can have a single stem, multiple stems, or any number of stems. The plant can have a tap root system or a fibrous root system. The substrate 106 is soil, but can alternatively be a sponge or any other suitable substrate. The components 120 of the machine 100 can manipulate any type of plant 102, any portion of the plant 102, or any portion of the substrate 106 independently.

The machine 100 includes multiple detection mechanisms 110 configured to image plants 102 in the field. In some configurations, each detection mechanism 110 is configured to image a single row of plants 102 but can image any number of plants in the geographic area 104. The detection mechanisms 110 function to identify individual plants 102, or parts of plants 102, as the machine 100 travels through the geographic area 104. The detection mechanism 110 can also identify elements of the environment surrounding the plants 102 of elements in the geographic area 104. The detection mechanism 110 can be used to control any of the components 120 such that a component 120 manipulates an identified plant, part of a plant, or element of the environment. In various configurations, the detection system 110 can include any number of sensors that can take a measurement to identify a plant. The sensors can include a multispectral camera, a stereo camera, a CCD camera, a single lens camera, hyperspectral imaging system, LIDAR system (light detection and ranging system), dynamometer, IR camera, thermal camera, or any other suitable detection mechanism.

Each detection mechanism 110 can be coupled to the machine 100 a distance away from a component 120. The detection mechanism 110 can be statically coupled to the machine 100 but can also be movably coupled (e.g., with a movable bracket) to the machine 100. Generally, machine 100 includes some detection mechanisms 110 that are positioned to capture data regarding a plant before the component 120 encounters the plant such that a plant can be identified before it is manipulated. In some configurations, the component 120 and detection mechanism 110 arranged such that the centerlines of the detection mechanism 110 (e.g. centerline of the field of view of the detection mechanism) and a component 120 are aligned, but can alternatively be arranged such that the centerlines are offset. Other detection mechanisms 110 may be arranged to observe the operation of one of the components 120 of the device, such as, for example, determining a frame angle of the mounting mechanism 140, a position of a manipulation component 120 relative to the field, a motion of a manipulation component 120, etc.

A component 120 of the machine 100 functions to manipulate plants 102 as the machine 100 travels through the geographic area. A component 120 of the machine 100 can, alternatively or additionally, function to affect the performance of the machine 100 even though it is not configured to manipulate a plant 102. For example, a component 120 may alter the current state of the machine 100. In some examples, the component 120 includes an active area 122 to which the component 120 manipulates. The effect of the manipulation can include plant necrosis, plant growth stimulation, plant portion necrosis or removal, plant portion growth stimulation, or any other suitable manipulation. The manipulation can include plant 102 dislodgement from the substrate 106, severing the plant 102 (e.g., cutting), fertilizing the plant 102, watering the plant 102, injecting one or more working fluids into the substrate adjacent the plant 102 (e.g., within a threshold distance from the plant), treating a portion of the plant 102, or otherwise manipulating the plant 102.

Generally, each component 120 is controlled by an actuator. Each actuator is configured to position and activate each component 120 such that the component 120 manipulates a plant 102 when instructed. Alternatively (or additionally), an actuator may be configured to activate a component to improve the performance of the farming machine, such as, for example, changing a height of a mounting mechanism relative to a field 140. In various example configurations, the actuator can position a component such that the active area 122 of the component 120 is aligned with a plant to be manipulated. Each actuator is communicatively coupled with an input controller that receives machine commands from the control system 130 instructing the component 120 to manipulate a plant 102. The component 120 is operable between a standby mode, where the component does not manipulate a plant 102 or affect machine 100 performance, and a manipulation mode, wherein the component 120 is controlled by the actuation controller to manipulate the plant or affects machine 100 performance. However, the component(s) 120 can be operable in any other suitable number of operation modes. Further, an operation mode can have any number of sub-modes configured to control manipulation of the plant 102 or affect performance of the machine.

The machine 100 can include a single component 120, or can include multiple components. The multiple components can be the same type of component, or be different types of components. In some configurations, a component can include any number of manipulation sub-components that, in aggregate, perform the function of a single component 120. For example, a component 120 configured to spray treatment fluid on a plant 102 can include sub-components such as a nozzle, a valve, a manifold, and a treatment fluid reservoir. The sub-components function together to spray treatment fluid on a plant 102 in the geographic area 104. In another example, a component 120 is configured to spray a plant 102 with a particular amount of treatment fluid. To spray the correct amount, the component 120 is positioned at a particular distance above the active area 122. Moving the component 130 to the particular distance above the active area 122 can employ various components 130 actuated by solenoids, motors, etc. to move the component 120.

In one example configuration, the machine 100 can additionally include a mounting mechanism 140 that functions to provide a mounting point for the various machine 100 elements. In one example, the mounting mechanism 140 statically retains and mechanically supports the positions of the detection mechanism(s) 110, component(s) 120, and verification system(s) 150 relative to a longitudinal axis of the mounting mechanism 140. The mounting mechanism 140 is a chassis or frame, but can alternatively be any other suitable mounting mechanism. In some configurations, there may be no mounting mechanism 140, or the mounting mechanism can be incorporated into any other component of the machine 100. In some configurations, the mounting mechanism 140 may also act as a component 120 in that an actuator may control the state (e.g., position, angle, etc.) of the mounting mechanism 140 such that the state of mounting mechanism can be used to improve the performance of the farming machine.

In one example machine 100, the system may also include a first set of coaxial wheels, each wheel of the set arranged along an opposing side of the mounting mechanism 140, and can additionally include a second set of coaxial wheels, wherein the rotational axis of the second set of wheels is parallel the rotational axis of the first set of wheels. However, the system can include any suitable number of wheels in any suitable configuration. The machine 100 may also include a coupling mechanism 142, such as a hitch, that functions to removably or statically couple to a drive mechanism, such as a tractor, more to the rear of the drive mechanism (such that the machine 100 is dragged behind the drive mechanism), but alternatively the front of the drive mechanism or to the side of the drive mechanism. Alternatively, the machine 100 can include the drive mechanism (e.g., a motor and drive train coupled to the first and/or second set of wheels). In other example systems, the system may have any other means of traversing through the field.

In some example systems, the detection mechanism 110 can be mounted to the mounting mechanism 140, such that the detection mechanism 110 traverses over a geographic location before the component 120 traverses over the geographic location. In one variation of the machine 100, the detection mechanism 110 is statically mounted to the mounting mechanism 140 proximal the component 120. In variants including a verification system 150, the verification system 150 is arranged distal to the detection mechanism 110, with the component 120 arranged there between, such that the verification system 150 traverses over the geographic location after component 120 traversal. However, the mounting mechanism 140 can retain the relative positions of the system components in any other suitable configuration. In other systems, the detection mechanism 110 can be incorporated into any other component of the machine 100.

The machine 100 can include a verification system 150 that functions to record a measurement of the system, the substrate, the geographic region, and/or the plants in the geographic area. The measurements are used to verify or determine the state of the system, the state of the environment, the state substrate, the geographic region, or the extent of plant manipulation by the machine 100. The verification system 150 can, in some configurations, record the measurements made by the verification system and/or access measurements previously made by the verification system 150. The verification system 150 can be used to empirically determine results of component 120 operation as the machine 100 manipulates plants 102. In other configurations, the verification system 150 can access measurements from the sensors and derive additional measurements from the data. In some configurations of the machine 100, the verification system 150 can be included in any other components of the system. The verification system 150 can be substantially similar to the detection mechanism 110, or be different from the detection mechanism 110.

In various configurations, the sensors of a verification system 150 can include a multispectral camera, a stereo camera, a CCD camera, a single lens camera, hyperspectral imaging system, LIDAR system (light detection and ranging system), dynamometer, IR camera, thermal camera, humidity sensor, light sensor, temperature sensor, speed sensor, rpm sensor, pressure sensor, or any other suitable sensor.

In some configurations, the machine 100 can additionally include a power source, which functions to power the system components, including the detection mechanism 100, control system 130, and component 120. The power source can be mounted to the mounting mechanism 140, can be removably coupled to the mounting mechanism 140, or can be separate from the system (e.g., located on the drive mechanism). The power source can be a rechargeable power source (e.g., a set of rechargeable batteries), an energy harvesting power source (e.g., a solar system), a fuel consuming power source (e.g., a set of fuel cells or an internal combustion system), or any other suitable power source. In other configurations, the power source can be incorporated into any other component of the machine 100.

In some configurations, the machine 100 can additionally include a communication apparatus, which functions to communicate (e.g., send and/or receive) data between the control system 130, the identification system 110, the verification system 150, and the components 120. The communication apparatus can be a Wi-Fi communication system, a cellular communication system, a short-range communication system (e.g., Bluetooth, NFC, etc.), a wired communication system or any other suitable communication system.

III. Boom Sprayer

Figure 2:
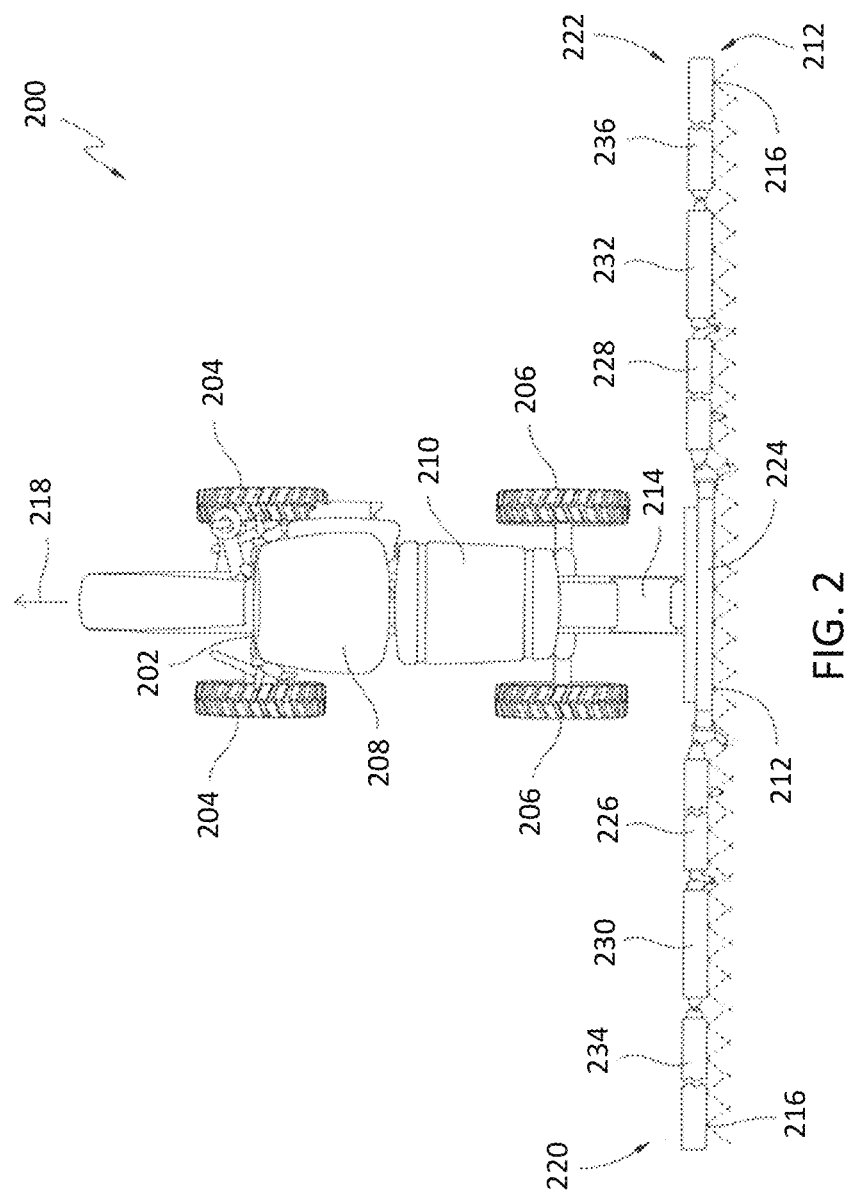
FIG. 2 is an illustration of a boom sprayer including its constituent components and sensors, according to one example embodiment.

FIG. 2 is an illustration of a boom sprayer including its constituent component and sensors, according to one example embodiment. The illustrated example is a top-down view of a boom sprayer where the boom sprayer is a vehicle carrying a spray boom with spray nozzles mounted on the boom. The vehicle may be a platform or dolly for industrial spray applications or a tractor towing ground-engaging tillage left/right wings with disks and shanks, or a planter towing a row of seed dispenser modules. In the illustrated embodiment of FIG. 2, the vehicle is a towed sprayer or a self-propelled agricultural sprayer 200 including a vehicle main frame 202 and an attached autonomous control station or an operator cab 208 for controlling the sprayer 200. The main frame 202 may be supported by a plurality of ground-engaging mechanisms. In FIG. 2, a pair of front wheels 204 and a pair of rear wheels 206 support the main frame and may propel the vehicle in at least a forward travel direction 218. A tank 210 may be mounted to the frame 202 or another frame (not shown) which is attached to the main frame 202. The tank 210 may contain a spray liquid (e.g., a treatment fluid) or other substance to be discharged during a spraying operation.

A fixed or floating center frame 214 is coupled to a front or a rear of the main frame 202. In FIG. 2, the center frame 214 is shown coupled to the rear of the main frame 202. The center frame 214 may support an articulated folding spray boom assembly 212 that is shown in FIG. 2 in its fully extended working position for spraying a field. In other examples, the spray boom assembly 212 may be mounted in front of the agricultural sprayer 200.

A plurality of spray nozzles 216 can be mounted along a fluid distribution pipe or spray pipe (not shown) that is mounted to the spray boom assembly 212 and fluidly coupled to the tank 210. Each nozzle 216 can have multiple spray outlets, each of which conducts fluid to a same-type or different-type of spray tip. The nozzles 216 on the spray boom assembly 212 can be divided into boom frames or wing structures such as 224, 226, 228, 230, 232, 234, and 236 (or collectively "spray section(s)"). In FIG. 2, the plurality of groups or sections may include a center boom frame 224 which may be coupled to the center frame 214. Although not shown in FIG. 2, a lift actuator may be coupled to the center frame 214 at one end and to the center boom frame 224 at the opposite end for lifting or lowering the center boom frame 224.

The spray boom assembly 212 may be further divided into a first or left boom 220 and a second or right boom 222. As illustrated in FIG. 2, the first boom 220 is shown on a left side of the spray boom assembly 212, and the second boom 222 is depicted on the right side thereof. In some instances, a left-most portion of the center boom frame 224 may form part of the first boom 220 and a right-most portion may form part of the second boom 222. In any event, the first boom 220 may include those boom frames which are disposed on a left-hand side of the spray boom assembly 212 including a first inner boom frame 226 (or commonly referred to as a "left inner wing"), a first outer boom frame 230 (or commonly referred to as a "lift outer wing"), and a first breakaway frame 234. Similarly, the second boom 222 may include those boom frames which are disposed on a right-hand side of the spray boom assembly 212 including a second inner boom frame 228 (or commonly referred to as a "right inner wing"), a second outer boom frame 232 (or commonly referred to as a "right outer wing"), and a second breakaway frame 236. Although seven boom frames are shown, there may any number of boom frames that form the spray boom assembly 212. Further, while illustrated as having three different spray sections (left, center, right), a boom sprayer may have any other number of spray sections.

As shown in FIG. 2, the first boom frame 226 may be pivotally coupled to the center boom frame 224 via various mechanical couplings. Other means for coupling the first boom frame 226 to the center boom frame 224 may be used. Similarly, the first outer boom frame 230 may be coupled to the first inner boom frame 226, and the first breakaway frame 234 may be coupled to the first outer boom frame 230. In some cases, these connections may be rigid connections, whereas in other embodiments the frames may be pivotably coupled to one another. Moreover, the second inner boom frame 228 may be coupled to the center boom frame 224, and the second outer boom frame 232 may be coupled to the second inner boom frame 228. Likewise, the second breakaway frame 236 may be coupled to the second outer boom frame 236. These couplings may be pivotal connections or rigid connections depending upon the type of boom.

In a conventional spray boom assembly, a tilt actuator may be provided for tilting each boom with respect to the center frame. In FIG. 2, for example, a first tilt actuator may be coupled at one end to the center frame 214 or the center boom frame 224, and at an opposite end to the first boom 220. During operation, the first boom 220 may be pivoted with respect to the center frame 214 or center boom frame 224 such that the first breakaway frame 234 may reach the highest point of the first boom 220. This may be useful if the sprayer 200 is moving in the travel direction 218 and an object is in the path of the first boom 220 such that the tilt actuator (not shown) may be actuated to raise the first boom 220 to avoid contacting the object. The same may be true of the second boom 222. Here, a second tilt actuator (not shown) may be actuated to pivot the second boom 222 with respect to the center frame 214 or the center boom frame 224.

As described above, one of the challenges with a conventional boom is that actuating the tilt cylinder may cause the entire boom, i.e., each of its individual frames, to raise or lower with respect to the ground. As this happens, the distance between each nozzle and the ground changes and may result in the distance exceeding a target distance. In effect, this can cause the spray from each nozzle to drift into non-targeted areas or not reach desired targets. The spraying operation can be ineffective and non-productive.

Thus, this disclosure provides one or more embodiments of sectional boom height control for individual sections of a sprayer. In this disclosure, the use of tilt control via the tilt actuators may be combined with the use of vertical movement control at each respective boom section. Each boom frame may include one or more individual boom sections. In other words, the first inner boom frame 226 may include one or more boom sections to which a plurality of nozzles is coupled. In another embodiment, the boom frame 202 may include a first boom section 204, a second boom section 206, a third boom section 208, and a fourth boom section 210. Each boom section may include a spray pipe which is fluidly coupled to a fluid source such as the tank 210. Moreover, a plurality of nozzles are fluidically coupled to the respective spray pipe.

More generally, the sprayer 200 may include any number of sensors to determine a position and a movement of the sprayer 200, a position and a movement of one or more of the spray sections, an amount of spray being sprayed by the sprayer 200, etc. In various examples, the sensors may include a GPS, a height estimation system, an inertial measurement unit, a gyroscope, etc. Further, the sprayer 200 may include any number of actuators to change the state (e.g., height, angle, etc.) of the sprayer 200 based on the measurements of the sensors. A particular configuration of sensors and actuators for a sprayer are described in more detail below.

IV. Control System Network

Figure 3A:
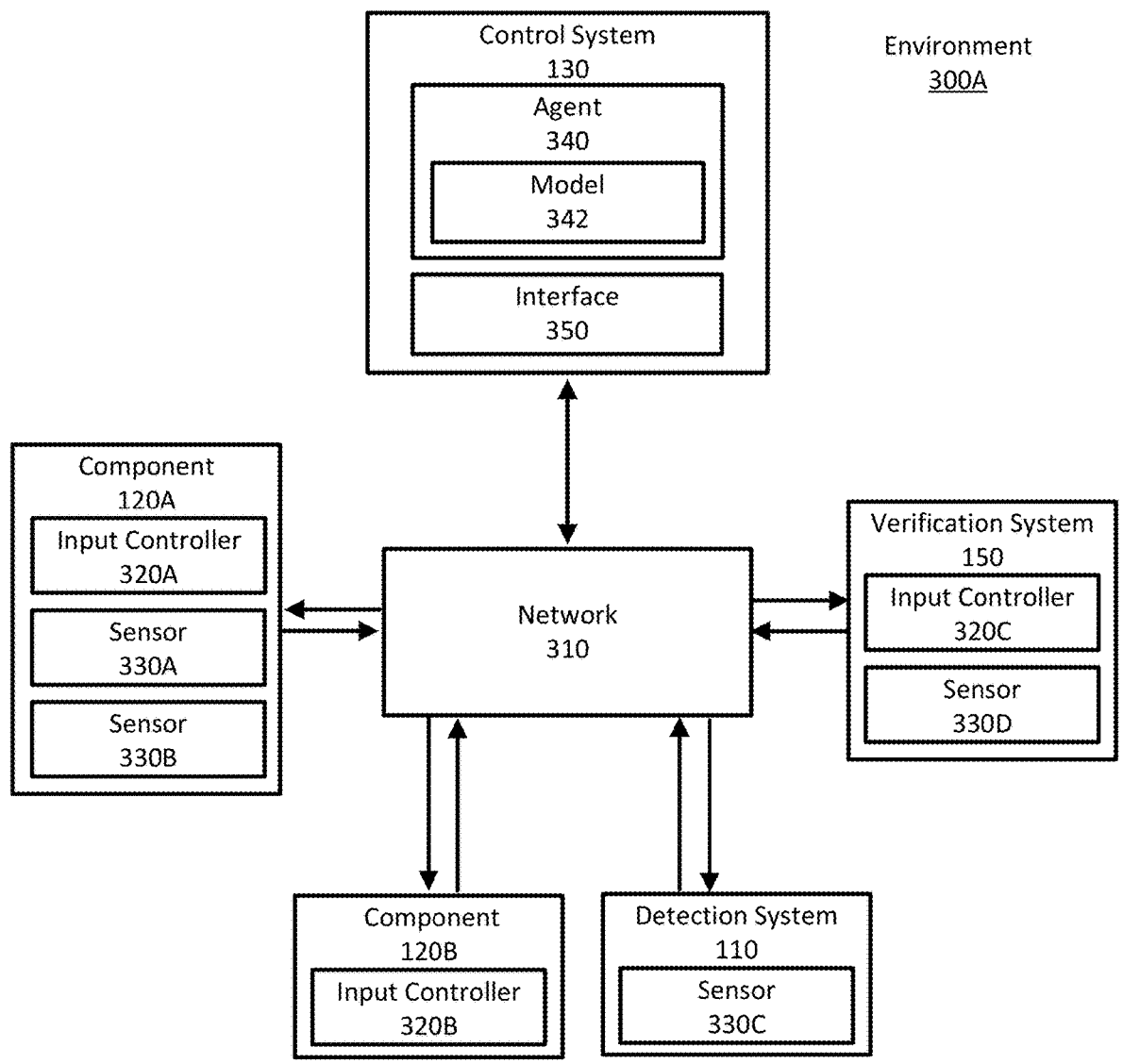
FIGS. 3A and 3B are illustration of a system environment for controlling the components of a machine configured to manipulate plants in a field, according to one example embodiment.
Figure 3B:
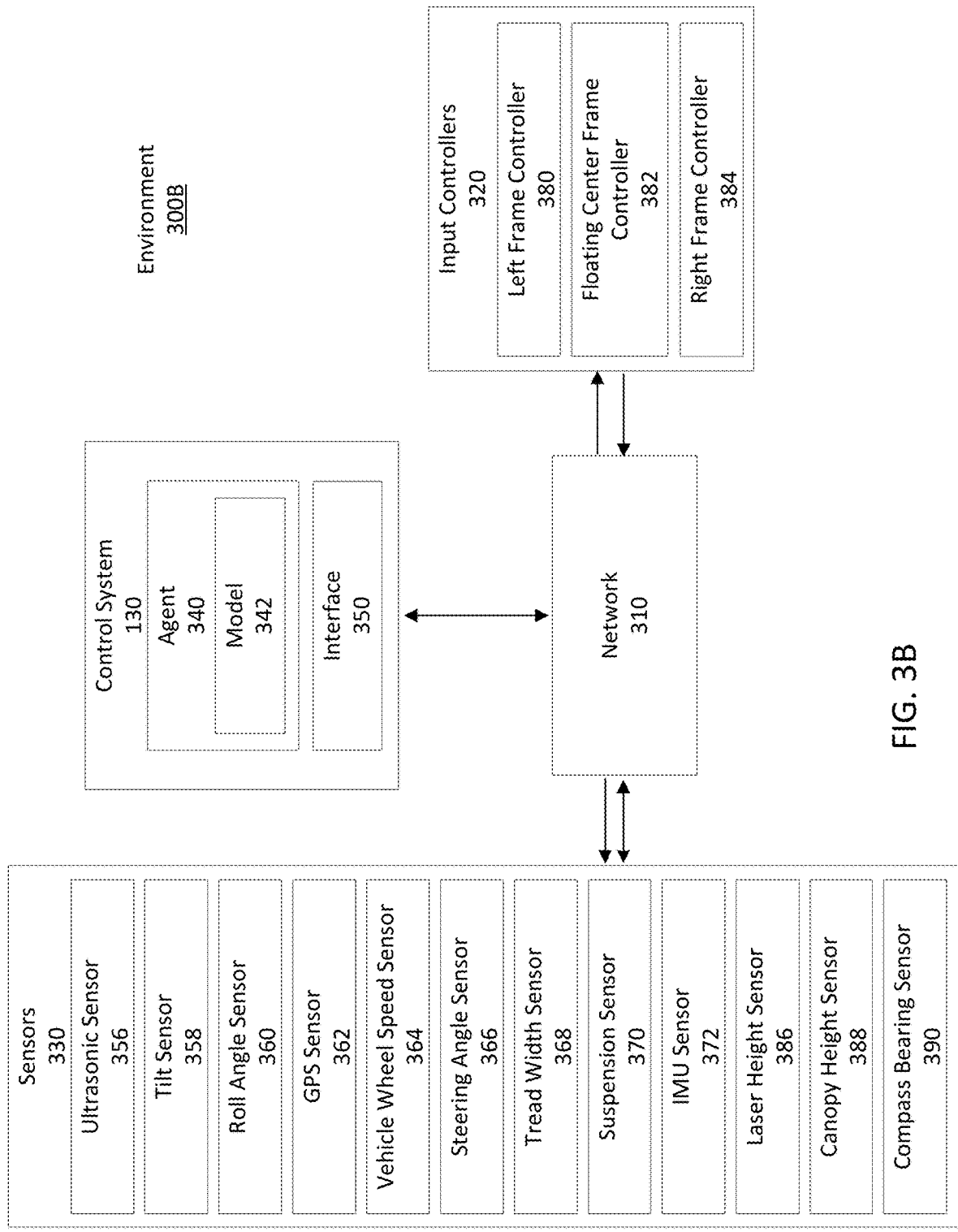

FIGS. 3A and 3B are high-level illustrations of a network environment 300, according to one example embodiment. The machine 100 includes a network digital data environment that connects the control system 130, detection system 110, the components 120, and the verification system 150 via a network 310.

Various elements connected within of the environment 300 include any number of input controllers 320 and sensors 330 to receive and generate data within the environment 300. The input controllers 320 are configured to receive data via the network 310 (e.g., from other sensors 330 such as those associated with the detection system 110) or from their associated sensors 330 and control (e.g., actuate) their associated component 120 or their associated sensors 330. Broadly, sensors 330 are configured to generate data (i.e., measurements) representing a configuration or capability of the machine 100. A "capability" of the machine 100, as referred to herein, is, in broad terms, a result of a component 120 action as the machine 100 manipulates plants 102 (takes actions) in a geographic area 104. Additionally, a "configuration" of the machine 100, as referred to herein, is, in broad terms, a current speed, position, setting, actuation level, angle, etc., of a component 120 as the machine 100 takes actions. A measurement of the configuration and/or capability of a component 120 or the machine 100 can be, more generally and as referred to herein, a measurement of the "state" of the machine 100. That is, various sensors 330 can monitor the components 120, the geographic area 104, the plants 102, the state of the machine 100, or any other aspect of the machine 100.

An agent 340 executing on the control system 130 inputs the measurements received from via the network 330 into a control model 342 as a state vector. Elements of the state vector can include numerical representations of the capabilities or states of the system generated from the measurements. The control model 342 generates an action vector for the machine 100 predicted by the model 342 to improve machine 100 performance. Each element of the action vector can be a numerical representation of an action the system can take to manipulate a plant, manipulate the environment, or otherwise affect the performance of the machine 100. The control system 130 sends machine commands to input controllers 320 based on the elements of the action vectors. The input controllers receive the machine commands and actuate their component 120 to take an action. Generally, the action leads to an increase in machine 100 performance.

In some configurations, control system 130 can include an interface 350. The interface 350 allows a user to interact with the control system 130 and control various aspects of the machine 100. Generally, the interface 350 includes an input device and a display device. The input device, can be one or more of a keyboard, button, touchscreen, lever, handle, knob, dial, potentiometer, variable resistor, shaft encoder, or other device or combination of devices that are configured to receive inputs from a user of the system. The display device can be a CRT, LCD, plasma display, or other display technology or combination of display technologies configured to provide information about the system to a user of the system. The interface can be used to control various aspects of the agent 340 and model 342.

The network 310 can be any system capable of communicating data and information between elements within the environment 300. In various configurations, the network 310 is a wired network, a wireless network, or a mixed wired and wireless network. In one example embodiment, the network is a controller area network (CAN) and the elements within the environment 300 communicate with each other over a CAN bus.

IV.A Example Control System Network

FIG. 3A illustrates an example embodiment of the environment 300A for a machine 100 (e.g., sprayer 200). In this example, the control system 130 is connected to a first component 120A and a second component 120B. The first component 120A includes an input controller 320A, a first sensor 330A, and a second sensor 330B. The input controller 320A receives machine commands from the network system 310 and actuates the component 120A in response. The first sensor 330A generates measurements representing a first state of the component 120A and the second sensor 330B generates measurements representing a configuration of the first component 120A when manipulating plants. The second component 120B includes an input controller 320B. The control system 130 is connected a detection system 110 including a sensor 330C configured to generate measurements for identifying plants 102. Finally, the control system 130 is connected to a verification system 150 that includes an input controller 320C and a sensor 330D. In this case, the input controller 320C receives machine commands that controls the position and sensing capabilities of the sensor 330D. The sensor 330D is configured to generate data representing the capability of component 120B that affects the performance of the machine 100.

In various other configurations, the machine 100 can include any number of detection systems 110, components 120, verifications systems 150, and/or networks 310. Accordingly, the environment 300A can be configured in a manner other than that illustrated in FIG. 3A. For example, the environment 300 can include any number of components 120, verification systems 150, and detection systems 110 with each element including various combinations of input controllers 320, and/or sensors 330.

IV.B Boom Sprayer Control System Network

FIG. 3B is a high-level illustration of a network environment 300B of the boom sprayer 200 illustrated in FIG. 2, according to one example embodiment. In this illustration, for clarity, elements of the environment 300B are grouped as input controllers 320 and sensors 330 rather than as their constituent elements (component 120, verification system 150, etc.).

The sensors 330 include one or more ultrasonic sensors 356, tilt sensors 358, roll angle sensors, global positioning system (GPS) sensors 362, vehicle wheel speed sensors 364, steering angle sensors 366, tread width sensors 368, suspension sensors 370, and inertial measurement unit (IMU) sensors 372, but can include any other sensor that can determine a state of the boom sprayer 200. For example, the sensors may additionally include a laser height sensor 386, a canopy height sensor 388, a compass bearing sensor 390, and a terrain sensor (or map), etc.

An ultrasonic sensor 356 can be configured to provide a measurement of the height the spray boom assembly 212, a segment of the boom spray assembly 212, or the entire boom sprayer 200 relative to the ground. For example, the boom sprayer assembly 212 may be segmented into three independently operable segments—a left boom 220, a right boom 222, and a center boom frame 224. Each segment may be independently configured to administer a treatment fluid to one or more plants in the field. The position and orientation of each segment of the frame may be dynamically adjusted as the vehicle navigates through a field, and, as such, the ultrasonic sensor 356 measures the position and orientation of each segment as the boom sprayer 200 travels through the field. The distance between the sprayer (or segment) and the plants and/or ground affects treatments made by the boom sprayer 200. For example, a treatment fluid may be designed for being sprayed towards a plant from a particular distance, and the ultrasonic sensors may provide feedback for adjusting the boom sprayer to the correct distance.

The boom sprayer 200 may include any number of ultrasonic sensors arrayed across the boom sprayer assembly 212. In an example configuration, at least one ultrasonic sensor 356 is physically coupled to each segment (e.g., the left boom 220, the right boom 222, and the center boom frame) of the boom sprayer assembly 212. In alternate embodiments, multiple ultrasonic sensors 356 are physically coupled to each segment of the spray boom assembly 212. For example, the left boom 220 may include an ultrasonic sensor 356 directed towards the ground or surface of the field and an ultrasonic sensor directed towards a top portion of a plant in the field. More generally, each segment may include any number of ultrasonic sensors 356 configured to provide one or more height measurements for the boom to which they are coupled. In some examples, the control system 130 may dynamically adjust the orientation of each ultrasonic sensor to measure distances between the boom sprayer 200 and other objects in the field.

A laser height sensor 386 can be configured to provide a measurement of the height the spray boom assembly 212, a segment of the boom spray assembly 212, or the entire boom sprayer 200 relative to the ground. The laser height sensor 386 may be similarly configured to the ultrasonic sensors 356 in that each segment of the boom sprayer may include one or more laser height sensors 385 such that the array of laser height sensors 386 is able to determine the distance between each segment and the ground as the boom sprayer 200 moves through the field.

A canopy height sensor 388 can be any sensor (e.g., ultrasonic, laser, etc.) configured to determine a measurement of the height the spray boom assembly 212, a segment of the boom spray assembly 212, or the entire boom sprayer 200 relative to a canopy of the plants. The canopy height sensor 388 may be similarly configured to the ultrasonic sensors 356 in that each segment of the boom sprayer 200 may include one or more canopy height sensor 388 such that the array of canopy height sensors 388 is able to determine the distance between each segment and the canopy as the boom sprayer 200 moves through the field.

A tilt sensor 356 can be configured to provide a measurement of the angle of the spray boom assembly 212 to relative to the body of the boom sprayer. Accordingly, data recorded by the tilt sensor 356 may be interpreted to characterize the slope, elevation, depression, or combination thereof of the boom sprayer relative to the ground of the field. In an embodiment, a title sensor 356 may be physically coupled to each segment 220, 222, and 224 of the spray boom assembly 212 to determine the angle of each segment relative to the ground. Alternatively, tilt sensors 356 may be implemented to record the relative angle between the left boom 220 and/or the right boom 222 and either the fixed or floating center frame 214 of the boom sprayer. More generally, one or more tilt sensors 356 may be employed by the boom sprayer to determine any number of angles for any portion of the spray boom assembly 212. Similar to above, tilt sensors 356 may provide additional information such that the boom sprayer 200 is able to maintain a specific distance between the ground and the sprayer when applying plant treatments.

A roll angle sensor 360 can be configured to provide a measurement of the roll angle of the boom assembly 212. In one implementation, a roll angle sensor 360 is a linear potentiometer that measures a voltage representing the roll angle. In some embodiments, roll angle sensors 360 are physically coupled between a center boom frame 224 of the spray boom assembly 212 and a floating center frame 214 to measure the roll angle of the floating frame 214 of the boom sprayer 200 relative to the fixed center frame 214.

GPS sensors 362 can be configured to provide a position of the boom sprayer 200. The position data recorded by a GPS sensor 362 may be a localized position within a field, or a global position with respect to latitude/longitude, or some other external reference system. In one embodiment, a GPS sensor 362 is a global positioning system interfacing with a static local ground-based GPS node mounted to the boom sprayer 200 to output a position of the boom sprayer 200. The GPS sensor 362 may additionally be configured to determine the altitude, orientation (e.g., compass bearing), pitch, or navigation speed of the boom sprayer 200 or particular components of the boom sprayer 200.

A suspension sensor 370 can be configured to provide a measurement of the distance between the ground of the field and a particular point on the boom sprayer's suspension. For example, the suspension sensor may measure the distance between the chassis (or drivetrain) of the boom sprayer 200 and the ground. In some configurations, the distance measurement recorded by a suspension sensor 370 may be extrapolated to represent the suspension of the entire boom sprayer 200. In one embodiment, a suspension sensor 370 is physically coupled to the suspension bracket of each of the left front wheel, the right front wheel, the left rear wheel, and the right rear wheel.

An IMU sensor 372 is configured to provide motion sensing through six degrees of freedom and a reporting of angular velocity, acceleration, and orientation data. For example, the IMU sensor 372 provides measurements of the aforementioned motions caused by gravity and/or the sway of boom arms forward and backwards. In one embodiment, an IMU sensor 372 is physically coupled to each of the chassis, a fixed or floating center frame 214, an inner edge of the left boom 220, an outer edge of the left boom 220, an inner edge of the right boom 222, and an outer edge of the right boom 222 of the spray boom assembly 212. In various other embodiments, the boom sprayer 200 may include any number of IMUs positioned about the boom sprayer 200 and boom sprayer assembly 212. Additionally, an IMU sensor 372 may be configured to measure one or more of the following characteristics of the boom sprayer 200: a pitch angle, a roll angle, a yaw rate, a pitch rate, a roll rate, a lateral acceleration, a longitudinal acceleration, and a vertical acceleration.

The boom sprayer 200 may additionally be outfitted with one or more additional sensors. For example, the boom sprayer 200 may be include a sensor configured to measure the speed at which the boom sprayer 200 moves (e.g., vehicle wheel speed sensor 364), a steering angle of the boom sprayer 200 (e.g., steering angle sensor 366), a compass bearing of the boom sprayer 200 (e.g., compass bearing sensor 390), and a rear tread width of the boom sprayer 200 (e.g., tread width sensor 368). The way the boom sprayer 200 moves through the field may affect the performance of the boom sprayer 200. For example, a boom sprayer 200 travelling at a high speed and/or taking sharp turn may have decreased performance relative to a boom sprayer 200 travelling slowly and taking gradual turns. In some configurations, the combination of positional and movement measurements may be combined with a terrain map and/or terrain map sensor.

In this case, the boom sprayer 200 is configured to determine its position on a map of the field as the boom sprayer 200 moves through the field. In this manner, the boom sprayer 200 may utilize a memory of an action, state, or result at a particular location to influence a current action taken at that location.

More generally, the combination measurements from the array of sensors on the boom sprayer 200 provide a representation of a distance between the boom sprayer assembly 212 and the ground across the length of the boom sprayer assembly 212. A control system 130 of the boom sprayer may utilize the information to actuate various components of the boom sprayer 200 to manage the distance between the boom assembly 212 and the ground and/or plants as it travels through the field.

One or more components (e.g., component 120) of the boom sprayer may controlled by an input controller 320. In this example, input controllers 320 of the boom sprayer include, for example, a left frame controller 380, a center frame controller 382, and a right frame controller 384, but can also include any other input controller than can control a component 120, identification system 110, or verification system 150. Each of the input controllers 320 is communicatively coupled to an actuator that can actuate its coupled element. Generally, the input controller can receive machine commands from the control system 130 and actuate a component 120 with the actuator in response.

The left frame controller 380 is coupled to the left boom 220 of the boom sprayer 200 and is configured to change the angle of the left boom 220 relative to the ground and/or the center boom frame 224 (or right boom 222). By changing the position (angle) of the left boom 220, treatment fluid may be applied by the boom sprayer to plants at varying positions or heights within the field. In some embodiments, the left frame controller 380 may also change the position of the right and center boom relative to the ground. The coupling of the left and right frames of the boom sprayer 200 to a (rotating) center frame allows the position and orientation of the right and center frames to be adjusted when the left frame is adjusted.

The right frame controller 384 is coupled to the right boom 222 of the boom sprayer 200 and is configured to change the angle of the right boom 222 relative to the ground and/or the center boom frame 224 (or left boom). By changing the position (angle) of the right boom 222, treatment fluid may be applied by the boom sprayer 200 to plants at varying positions or heights within the field. In some embodiments, the right frame controller 384 may also change the position of the left and center boom relative to the ground. The coupling of the left and right frames of the boom sprayer 200 to a (rotating) center frame allows the position and orientation of the left and center frames to be adjusted when the right frame is adjusted.

The center frame controller 382 is coupled to the center boom frame 224 of the spray boom assembly 212 and is configured to change the position of the center boom frame 224 relative to the ground. By changing the position (height) of the center frame 224, the angle and orientation of the right and left booms may be adjusted to improve the application of treatment fluid to plants in the field. In some embodiments, the left frame controller 380, the center frame controller 382, and the right frame controllers 384 are integrated into a single controller, but the control system generates instructions to actuate each respective frame using independent algorithms for each.

V. Control System Agent

As described above, the control system 130 executes an agent 340 that can control the various components 120 of machine 100 in real time and functions to improve the performance of that machine 100. Generally, the agent 340 is any program or method that can receive measurements from sensors 340 of the machine 100 and generate machine commands for the input controllers 330 coupled to the components 120 of the machine 100. The generated machine commands cause the input controllers 330 to actuate components 120 and change their state and, accordingly, change their performance. The changed state of the components 120 improves the overall performance of the machine 100.

In one embodiment, the agent 340 executing on the control system 130 can be described as executing the following function:

$$a = \mathcal{F}(s) \quad (4.1)$$

where s is an input state vector, the a is an output action vector, and the function F is a machine learning model that functions to generate output action vectors that improve the performance of the machine 100 given input state vectors.

Generally, the input state vector s is a representation of the measurements received from sensors 320 of the machine 100. In some cases, the elements of the input state vector s are the measurements themselves, while in other cases, the control system 130 determines an input state vector s from the measurements M using an input function I such as:

$$s = \mathcal{I}(m) \quad (4.2)$$

where the input function I can be any function that can convert measurements from the machine 100 into elements of an input function I. In some cases, the input function can calculate differences between an input state vector and a previous input state vector (e.g., at an earlier time step). In other cases, the input function can manipulate the input state vector such that it is compatible with the function F (e.g., removing errors, ensuring elements are within bounds, etc.).

Additionally, the output action vector a is a representation of the machine commands c that can be transmitted to input controllers 320 of the machine 100. In some cases, the elements of the output action vector a are machine commands, while in other cases, the control system 130 determines machine commands from the output action vector a using an output function O:

$$c = O(a) \quad (4.3)$$

where the output function O can be any function that can convert the output action vector into machine commands for the input controllers 320. In some examples the output function can function to ensure that the generated machine commands are within tolerances of their respective components 120 (e.g., not rotating too fast, not opening too wide, etc.).

In various other configurations, the machine learning model can use any function or method to model the unknown dynamics of the machine 100. In this case, the agent 340 can use a dynamic model 342 to dynamically generate machine commands for controlling the machine 100 and improve machine 100 performance. In various configurations the model can be any of: function approximators, probabilistic dynamics models such as Gaussian processes, neural networks, or any other similar model. In various configurations, the agent 340 and model 342 can be trained using any of: Q-learning methods, state-action-state-reward methods, deep Q network methods, actor-critic methods, or any other method of training an agent 340 and model 342 such that the agent 340 can control the machine 100 based on the model 442.

In the example where the machine 100 is a boom sprayer 200, the performance can be represented by any of a set of metrics including one or more of: (i) a distance between the boom sprayer assembly 212 and the plant, (ii) a metric quantifying the average, variance, standard deviation, etc. of the distance between the boom sprayer assembly and the plant over time, (iii) a distance between the boom sprayer assembly and the ground, (iv) a metric quantifying the average, variance, standard deviation, max deviation etc. of the distance between the boom sprayer assembly and the ground over time, (v) a measure of amount of plant treated, and (vi) a quality of a treatment applied to the plant. The amount of planted treated can be the fraction or percentage of the plant to which a treatment is applied or the volume of treatment fluid applied to treated plants, and the quality of treatment may be quantified by a metric such as overspray or under-spray of a plant. As described previously, the performance can be determined by the control system 130 using measurements from any of the sensors 330 of the boom sprayer. Therefore, improving machine 100 performance can, in specific embodiments of the invention, include improving any one or more of these metrics, as determined by the receipt of improved measurements from the machine 100 with respect to any one or more of these metrics.

VI. Reinforcement Learning

In one embodiment, the agent 340 can execute a model 342 including deterministic methods that have been trained with reinforcement learning (thereby creating a reinforcement learning model). The model 342 is trained to increase the machine 100 performance using measurements from sensors 330 as inputs, and machine commands for input controllers 320 as outputs.

Reinforcement learning is a machine learning system in which a machine learns 'what to do'—how to map situations to actions—so as to maximize a numerical reward signal. The learner (e.g. the machine 100) is not told which actions to take (e.g., generating machine commands for input controllers 320 of components 120), but instead discovers which actions yield the most reward (e.g., maintaining the boom sprayer assembly at a specific height relative to the ground over time) by trying them. In some cases, actions may affect not only the immediate reward but also the next situation and, through that, all subsequent rewards. These two characteristics—trial-and-error search and delayed reward—are two distinguishing features of reinforcement learning.

Reinforcement learning is defined not by characterizing learning methods, but by characterizing a learning problem. Basically, a reinforcement learning system captures those important aspects of the problem facing a learning agent interacting with its environment to achieve a goal. That is, in the example of a boom sprayer, the reinforcement learning system captures the system dynamics of the boom sprayer 200 as it treats plants in a field. Such an agent senses the state of the environment and takes actions that affect the state to achieve a goal or goals. In its most basic form, the formulation of reinforcement learning includes three aspects for the learner: sensation, action, and goal. Continuing with the boom sprayer 200 example, the boom sprayer 200 senses the state of the environment with sensors, takes actions in that environment with machine commands, and achieves a goal that is a measure of the boom sprayer performance in treating grain crops.

One of the challenges that arises in reinforcement learning is the trade-off between exploration and exploitation. To increase the reward in the system, a reinforcement learning agent prefers actions that it has tried in the past and found to be effective in producing reward. However, to discover actions that produce reward, the learning agent selects actions that it has not selected before. The agent 'exploits' information that it already knows in order to obtain a reward, but it also 'explores' information in order to make better action selections in the future. The learning agent tries a variety of actions and progressively favors those that appear to be best while still attempting new actions. On a stochastic task, each action is generally tried many times to gain a reliable estimate to its expected reward. For example, if the boom sprayer is executing an agent that knows a particular boom sprayer 200 speed leads to good system performance, the agent may change the boom sprayer speed with a machine command to see if the change in speed influences system performance. In other words, the reinforcement learning model may employ various stochastic functions that deliberately do not optimize performance in order to find one or more actions that may later optimize performance.

Further, reinforcement learning considers the whole problem of a goal-directed agent interacting with an uncertain environment. Reinforcement learning agents have explicit goals, can sense aspects of their environments, and can choose actions to receive high rewards (i.e., increase system performance). Moreover, agents generally operate despite significant uncertainty about the environment it faces. When reinforcement learning involves planning, the system addresses the interplay between planning and real-time action selection, as well as the question of how environmental elements are acquired and improved. For reinforcement learning to make progress, important sub problems are isolated and studied, the sub problems playing clear roles in complete, interactive, goal-seeking agents.

VI.A The Agent-Environment Interface

The reinforcement learning problem is a framing of a machine learning problem where interactions are processed and actions are carried out to achieve a goal. The learner and decision-maker is called the agent (e.g., agent 340 of boom sprayer 200). The thing it interacts with, comprising everything outside the agent, is called the environment (e.g., environment 300, plants 102, the geographic area 104, dynamics of the boom sprayer process, etc.). These two interact continually, the agent selecting actions (e.g., machine commands for input controllers 320) and the environment responding to those actions and presenting new situations to the agent. The environment also gives rise to rewards, special numerical values that the agent tries to maximize over time. In one context, the rewards act to maximize system performance over time. A complete specification of an environment defines a task which is one instance of the reinforcement learning problem.

Figure 4:
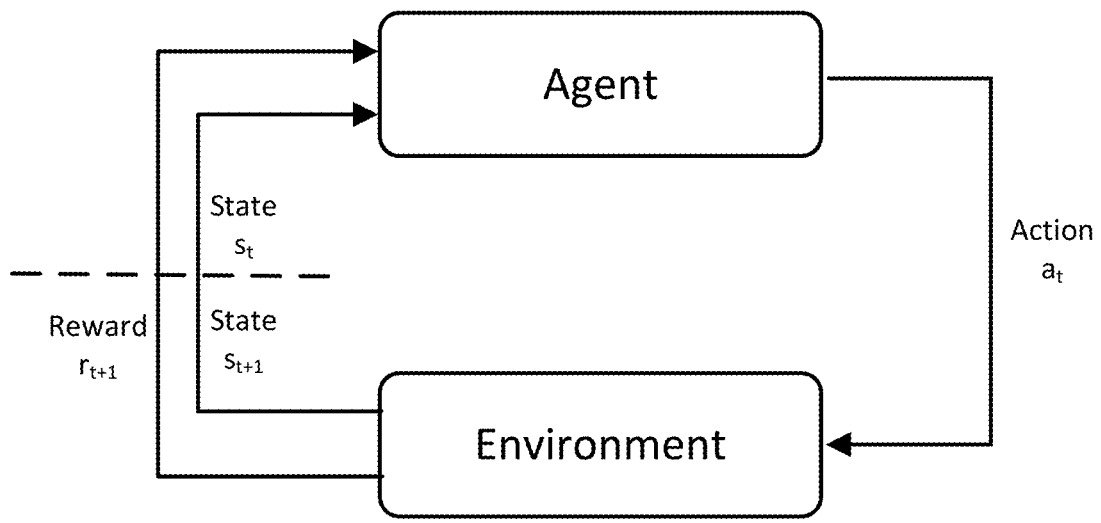
FIG. 4 is an illustration of the agent/environment relationship in reinforcement learning systems according to one embodiment.

FIG. 4 diagrams the agent-environment interaction. More specifically, the agent (e.g., agent 340 of boom sprayer 200) and environment interact at each of a sequence of discrete time steps, i.e. t=0, 1, 2, 3, etc. At each time step t the agent receives some representation of the environment's state $s_t$ (e.g., measurements from sensor representing a state of the machine 100). The states $s_t$ are within S, where S is the set of possible states. Based on the state $s_t$ and the time step t, the agent selects an action at (e.g., a set of machine commands to change a configuration of a component 120). The action at is within $A(s_t)$, where $A(s_t)$ is the set of possible actions. One time state later, in part as a consequence of its action, the agent receives a numerical reward $r_{t+1}$. The states $r_{t+1}$ are within R, where R is the set of possible rewards. Once the agent receives the reward, the agent selects in a new state $s_{t+1}$.

At each time step, the agent implements a mapping from states to probabilities of selecting each possible action. This mapping is called the agent's policy and is denoted $\pi_t$ where $\pi_t(s,a)$ is the probability that $a_t=a$ if $s_t=s$. Reinforcement learning methods can dictate how the agent changes its policy as a result of the states and rewards resulting from agent actions. The agent's goal is to maximize the total amount of reward it receives over time.

This reinforcement learning framework is flexible and can be applied to many different problems in many different ways (e.g. to agriculture machines operating in a field). The framework proposes that whatever the details of the sensory, memory, and control apparatus, any problem (or objective) of learning goal-directed behavior can be reduced to three signals passing back and forth between an agent and its environment: one signal to represent the choices made by the agent (the actions), one signal to represent the basis on which the choices are made (the states), and one signal to define the agent's goal (the rewards).

Continuing, the time steps between actions and state measurements need not refer to fixed intervals of real time; they can refer to arbitrary successive stages of decision-making and acting. The actions can be low-level controls, such as the voltages applied to the motors of a boom sprayer, or high-level decisions, such as whether or not to plant a seed with a planter. Similarly, the states can take a wide variety of forms. They can be completely determined by low-level sensations, such as direct sensor readings, or they can be more high-level, such as symbolic descriptions of the soil quality. States can be based on previous sensations or even be subjective. Similarly, actions can be based previous actions, policies, or can be subjective. In general, actions can be any decisions the agent learns how to make to achieve a reward, and the states can be anything the agent can know that might be useful in selecting those actions.

Additionally, the boundary between the agent and the environment is generally not solely physical. For example, certain aspects of agricultural machinery, for example sensors 330, or the field in which it operates, can be considered parts of the environment rather than parts of the agent. Generally, anything that cannot be changed by the agent at the agent's discretion is considered to be outside of the agent and part of the environment. The agent-environment boundary represents the limit of the agent's absolute control, not of the agent's knowledge. As an example, the size of a tire of an agricultural machine can be part of the environment as it cannot be changed by the agent, but the angle of rotation of an axle on which the tire resides can be part of the agent as it is changeable, in this case controllable by actuation of the drivetrain of the machine. Additionally, the dampness of the soil in which the agricultural machine operates can be part of the environment, particularly if it is measured before an agricultural machine passes over it; however, the dampness or moisture of the soil can also be a part of the agent if the agricultural machine is configured to measure dampness/moisture after passing over that part of the soil and after applying water or another liquid to the soil. Similarly, rewards are computed inside the physical entity of the agricultural machine and artificial learning system, but are considered external to the agent.

The agent-environment boundary can be located at different places for different purposes. In an agricultural machine, many different agents may be operating at once, each with its own boundary. For example, one agent may make high-level decisions (e.g. increase the seed planting depth) which form part of the states faced by a lower-level agent (e.g. the agent controlling air pressure in the seeder)

that implements the high-level decisions. In practice, the agent-environment boundary can be determined based on states, actions, and rewards, and can be associated with a specific decision-making task of interest.

Particular states and actions vary greatly from application to application, and how they are represented can strongly affect the performance of the implemented reinforcement learning system.

VII. Reinforcement Learning Methods

Within this section a variety of methodologies used for reinforcement learning are described. Any aspect of any of these methodologies can be applied to a reinforcement learning system within an agricultural machine operating in a field. Generally, the agent is the machine operating in the field and the environment are elements of the machine and the field not under direct control of the machine. States are measurements of the environment and how the machine is interacting within it, actions are decisions and actions taken by the agent to affect states, and results are a numerical representation to improvements (or decreases) of states.

VII.A Action-Value and State-Value Functions

Reinforcement learning models can be based on estimating state-value functions or action-value functions. These functions of states, or of state-action pairs, estimate the value of the agent to be in a given state (or how valuable performing a given action in a given state is). The idea of 'value' is defined in terms of future rewards that can be expected by the agent, or, in terms of expected return of the agent. The rewards the agent can expect to receive in the future depend on what actions it will take. Accordingly, value functions are defined with respect to particular policies.

Recall that a policy, $\pi$, is a mapping from each state, $s \in S$, and action $a \in A$ (or $a \in A(s)$), to the probability $\pi(s,a)$ of taking action a when in state s. Given these definitions, the policy $\pi$ is the function F in Equation 4.1. Informally, the value of a state s under a policy $\pi$, denoted $V\pi(s)$, is the expected return when starting in s and following $\pi$ thereafter. For example, we can define $V\pi(s)$ formally as $$V^{\pi}(s) = E_{\pi}\{R_t | s_t = s\} = E_{\pi}\{\Sigma_{k=0}^{\infty} \gamma^k r_{t+k+1} | s_t = s\} \quad (6.1)$$

where $E\pi\{\}$ denotes the expected value given that the agent follows policy $\pi$, $\gamma$ is a weight function, and t is any time step. Note that the value of the terminal state, if any, is generally zero. The function $V\pi$ the state-value function for policy $\pi$.

Similarly, we define the value of taking action a in state s under a policy $\pi$, denoted $Q\pi(s,a)$, as the expected return starting from s, taking the action a, and thereafter following policy $\pi$:

$$Q^{\pi}(s,a) = E_{\pi}\{R_t | s_t = s, a_t = a\} = E_{\pi}\{\Sigma_{k=0}^{\infty} \gamma^k r_{t+k+1} | s_t = s | a_t = a\} \quad (6.2)$$

where $E\pi\{\}$ denotes the expected value given that the agent follows policy $\pi$, $\gamma$ is a weight function, and t is any time step. Note that the value of the terminal state, if any, is generally zero. The function $Q\pi$, can be called the action-value function for policy $\pi$.

The value functions $V\pi$ and $Q\pi$ can be estimated from experience. For example, if an agent follows policy $\pi$ and maintains an average, for each state encountered, of the actual returns that have followed that state, then the average will converge to the state's value, $V\pi(s)$, as the number of times that state is encountered approaches infinity. If separate averages are kept for each action taken in a state, then these averages will similarly converge to the action values, $Q\pi(s,a)$. Estimation methods similar to these are called Monte Carlo (MC) methods because they involve averaging over many random samples of actual returns. In some cases, there are many states and it may not be practical to keep separate averages for each state individually. Instead, the agent can maintain $V\pi$ and $Q\pi$ as parameterized functions and adjust the parameters to better match the observed returns. This can also produce accurate estimates, although much depends on the nature of the parameterized function approximator.

One property of state-value functions and action-value functions used in reinforcement learning and dynamic programming is that they satisfy particular recursive relationships. For any policy $\pi$ and any state s, the following consistency condition holds between the value of s and the value of its possible successor states:

$$V^{\pi}(s) = E_{\pi}\{R_t | s_t = s\} \quad (6.3)$$

$$= E_{\pi}\left\{\sum_{k=0}^{\infty} \gamma^k r_{t+k+1} \middle| s_t = s\right\} \quad (6.4)$$

$$= E_{\pi}\left\{r_{t+1} + \gamma \sum_{k=0}^{\infty} \gamma^k r_{t+k+2} \middle| s_t = s\right\} \quad (6.5)$$

$$= \sum_{a} \pi(s, a) \sum_{s'} P_{ss'}^{a} [R_{ss'}^{a} + \gamma V^{\pi}(s')] \quad (6.6)$$

where P are a set of transition probabilities between subsequent states from the actions a taken from the set A(s), R represents expected immediate rewards from the actions a taken from the set A(s), and the subsequent states s' are taken from the set S, or from the set S' in the case of an episodic problem. This equation is the Bellman equation for $V\pi$. The Bellman equation expresses a relationship between the value of a state and the values of its successor states. More simply, this equation is a way of visualizing the transition from one state to its possible successor states. From each of these, the environment could respond with one of several subsequent states s' along with a reward r. The Bellman equation averages over all the possibilities, weighting each by its probability of occurring. The equation states that the value of the initial state equal the (discounted) value of the expected next state, plus the reward expected along the way. The value function $V\pi$ is the unique solution to its Bellman equation. These operations transfer value information back to a state (or a state-action pair) from its successor states (or state-action pairs).

VII.B Policy Iteration

Continuing with methods used in reinforcement learning systems, the description turns to policy iteration. Once a policy, $\pi$, has been improved using $V\pi$ to yield a better policy, $\pi'$, the system can then compute $V\pi'$ and improve it again to yield an even better $\pi''$. The system then determines a sequence of monotonically improving policies and value functions:

$$\pi_0 \xrightarrow{E} V^{\pi_0} \xrightarrow{I} \pi_1 \xrightarrow{E} V^{\pi_1} \xrightarrow{I} \pi_2 \xrightarrow{E} \ldots \xrightarrow{I} \pi^* \xrightarrow{E} V^* \quad (6.7)$$

where E denotes a policy evaluation and I denotes a policy improvement. Each policy is generally an improvement over the previous policy (unless it is already optimal). In reinforcement learning models that have only a finite number of policies, this process can converge to an optimal policy and optimal value function in a finite number of iterations.

This way of finding an optimal policy is called policy iteration. An example model for policy iteration is given if FIG. 5A. Note that each policy evaluation, itself an iterative computation, begins with the value (either state or action) function for the previous policy. Typically, this results in an increase in the speed of convergence of policy evaluation. In one embodiment, a policy iteration model implements deep deterministic policy gradients or proximal policy optimization.

VII.C Value Iteration

Continuing with methods used in reinforcement learning systems, the description turns to value iteration. Value iteration is a special case of policy iteration in which the policy evaluation is stopped after just one sweep (one backup of each state). A value iteration can be written as a backup operation in which an agent institutes a policy improvement and truncated policy evaluation steps as:

$$V_{k+1}(s) = \max_a E_\pi \{r_{t+1} + \gamma V_k(s_{t+1}) | s_t = s, a_t = a\} \quad (6.8)$$

$$= \max_a \sum_a \pi(s,a) \sum_{s'} P^a_{ss'} [R^a_{ss'} + \gamma V^\pi(s')] \quad (6.9)$$

for all s∈S, where $\max_a$ selects the highest value function. For an arbitrary V0, the sequence {Vk} can be shown to converge to V* under the same conditions that guarantee the existence of V*.

Another way of understanding value iteration is by reference to the Bellman equation (previously described). Note that value iteration is obtained simply by turning the Bellman equation into an update rule to a model for reinforcement learning. Further, note how the value iteration backup is similar to the policy evaluation backup except that the maximum is taken over all actions. Another way of seeing this close relationship is to compare the backup diagrams for these models. These two are the natural backup operations for computing Vπ and V*.

Similar to policy evaluation, value iteration formally uses an infinite number of iterations to converge exactly to V*. In practice, value iteration terminates once the value function changes by only a small amount in an incremental step. FIG. 5B gives an example value iteration model with this kind of termination condition.

Value iteration effectively combines, in each of its sweeps, one sweep of policy evaluation and one sweep of policy improvement. Faster convergence is often achieved by interposing multiple policy evaluation sweeps between each policy improvement sweep. In general, the entire class of truncated policy iteration models can be thought of as sequences of sweeps, some of which use policy evaluation backups and some of which use value iteration backups. Since the $\max_a$ operation is the only difference between these backups, this indicates that the $\max_a$ operation is added to some sweeps of policy evaluation.

VII.D Temporal-Difference Learning

Both temporal difference (TD) and MC methods use experience to solve the prediction problem. Given some experience following a policy π, both methods update their estimate V of V*. If a nonterminal state $s_t$ is visited at time t, then both methods update their estimate $V(s_t)$ based on what happens after that visit. Roughly speaking, Monte Carlo methods wait until the return following the visit is known, then use that return as a target for $V(s_t)$. A simple every-visit MC method suitable for nonstationary environments is $$V(s_t) \leftarrow V(s_t) + \alpha[R_t - V(s_t)] \quad (6.11)$$

where $R_t$ is the actual return following time t and a is a constant step-size parameter. Generally, MC methods wait until the end of the episode to determine the increment to $V(s_t)$ and only then is $R_t$ known, while TD methods need wait only until the next time step. At time t+1 TD methods immediately form a target and make an update using the observed reward rt+1 and the estimate $V(s_{t+1})$. The simplest TD method, known as TD(t=0), is $$V(s_t) \leftarrow V(s_t) + \alpha[r_{t+1} + \gamma V(s_{t+1}) - V(s_t)] \quad (6.12)$$

In effect, the target for the Monte Carlo update is $R_t$, whereas the target for the TD update is $$r_{t+1} + \gamma V(s_{t+1}) \quad (6.13)$$

Because the TD method bases its update in part on an existing estimate, we say that it is a bootstrapping method. From previously, $$V^\pi(s) = E_\pi \left\{ \sum_{k=0}^\infty \gamma^k r_{t+k+1} \,\bigg|\, s_t = s \right\} \quad (6.14)$$

$$= E_\pi \left\{ r_{t+1} + \gamma \sum_{k=0}^\infty \gamma^k r_{t+k+2} \,\bigg|\, s_t = s \right\} \quad (6.15)$$

Roughly speaking, Monte Carlo methods use an estimate of 6.14 as a target, whereas other methods use an estimate of 6.15 as a target. The MC target is an estimate because the expected value in 6.14 is not known; a sample return is used in place of the real expected return. The other method target is an estimate not because of the expected values, which are assumed to be completely provided by a model of the environment, but because $V\pi(s_{t+1})$ is not known and the current estimate, $V_t(s_{t+1})$ is used instead. The TD target is an estimate for both reasons: it samples the expected values in 6.15 and it uses the current estimate $V_t$ instead of the true $V_\pi$. Thus, TD methods combine the sampling of MC with the bootstrapping of other reinforcement learning methods.

TD and Monte Carlo updates are sample backups because they involve looking ahead to a sample successor state (or state-action pair), using the value of the successor and the reward along the way to compute a backed-up value, and then changing the value of the original state (or state-action pair) accordingly. Sample backups differ from the full backups of DP methods in that they are based on a single sample successor rather than on a complete distribution of all possible successors. An example model for temporal-difference calculations is given in procedural from in FIG. 5C.

VII.E Q-Learning

Another method used in reinforcement learning systems is an off-policy TD control model known as Q-learning. Its simplest form, one-step Q-learning, is defined by $$Q(s_t, a_t) \leftarrow Q(s_t, a_t) + \alpha[r_{t+1} + \gamma \max_a Q(s_{t+1}, a) - Q(s_t, a_t)] \quad (6.16)$$

In this case, the learned action-value function Q directly approximates Q*, the optimal action-value function, independent of the policy being followed. This simplifies the analysis of the model and enabled early convergence proofs. The policy still has an effect in that it determines which state-action pairs are visited and updated. However, all that is required for correct convergence is that all pairs continue to be updated. This is a minimal requirement in the sense that any method guaranteed to find optimal behavior in the general case uses it. Under this assumption and a variant of the usual stochastic approximation conditions on the sequence of step-size parameters has been shown to converge with probability 1 to Q*. The Q-learning model is shown in procedural form in FIG. 5D. In one embodiment, a Q-learning model implements double deep Q-learning techniques.

VII.F Value Prediction

Other methods used in reinforcement learning systems use value prediction. Generally, the discussed methods are trying to predict that an action taken in the environment will increase the reward within the agent environment system. Viewing each backup (i.e. previous state or action-state pair) as a conventional training example in this way enables us to use any of a wide range of existing function approximation methods for value prediction. In reinforcement learning, it is important that learning be able to occur on-line, while interacting with the environment or with a model (e.g., a dynamic model) of the environment. To do this involves methods that are able to learn efficiently from incrementally acquired data. In addition, reinforcement learning generally uses function approximation methods able to handle non-stationary target functions (target functions that change over time). Even if the policy remains the same, the target values of training examples are nonstationary if they are generated by bootstrapping methods (TD). Methods that cannot easily handle such nonstationary are less suitable for reinforcement learning.

VII.G Actor-Critic Training

Figure 5E:
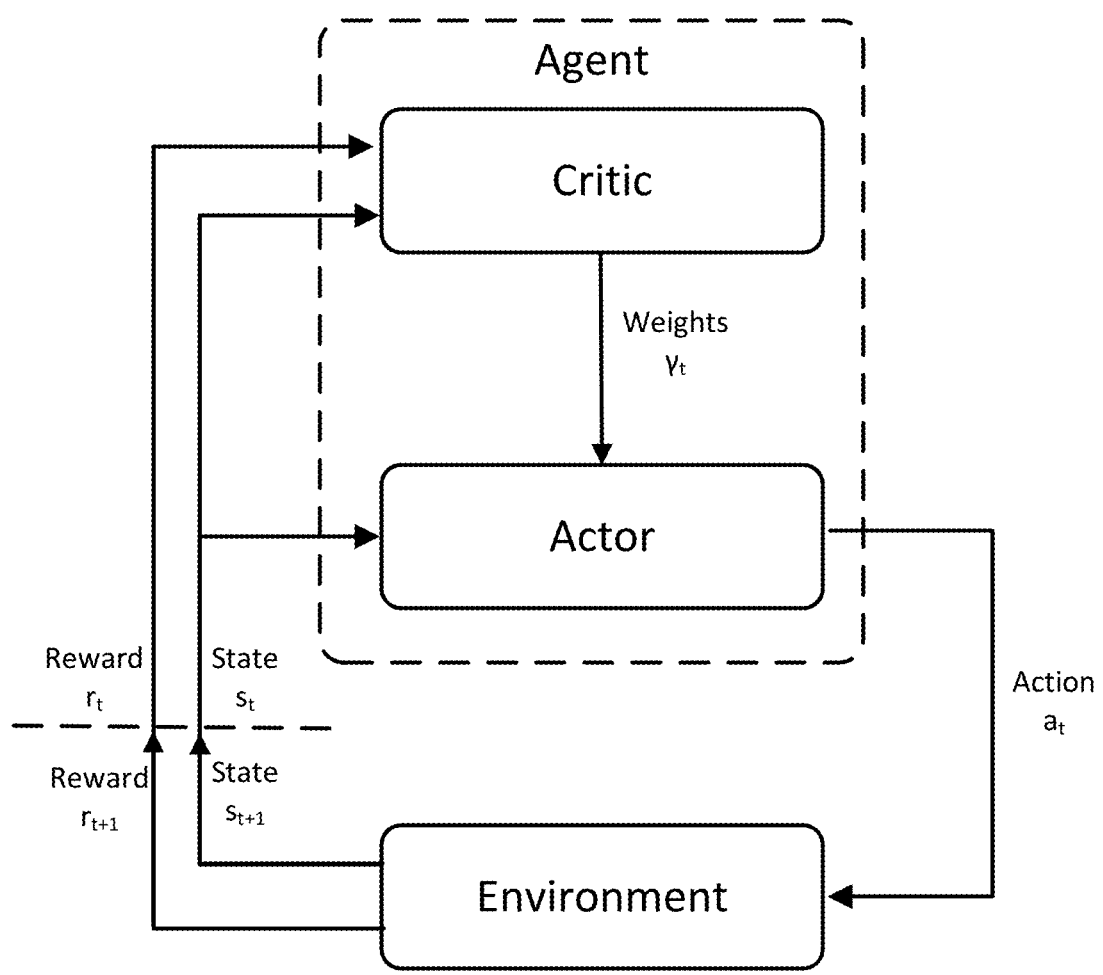

Another example of a reinforcement learning method is an actor critic-method. The actor-critic method can use temporal difference methods or direct policy search methods to determine a policy for the agent. The actor-critic method includes an agent with an actor and a critic. The actor inputs determined state information about the environment and weight functions for the policy and outputs an action. The critic inputs state information about the environment and a reward determined from the states and outputs the weight functions for the actor. The actor and critic work in conjunction to develop a policy for the agent that maximizes the rewards for actions. FIG. 5E illustrates an example of an agent-environment interface for an agent including an actor and critic. In one embodiment, an actor-critic trained model implements soft actor critic techniques.

VII.H Other Model-Based Machine Learning Techniques

In other embodiments, the agent 340 implements model-based machine learning techniques in conjunction with, or in place of, model free learning approaches described above. Model-based machine learning techniques provide several advantages relative to model free learning techniques. For example, the amount of training data can be reduced by orders of magnitude with model based methods. In another example, model-based machine learning techniques are easier interpret than their model free counterparts.

As described above, a farming machine 100 (e.g., sprayer 200) may employ an agent (e.g., agent 340) including both reinforcement learning algorithm and a more traditional model based machine learning algorithm. The agent may employ the different algorithms in different circumstances such that the agent leverages the advantages of both types of models. For example, an agent may employ a traditional model-based machine learning algorithm initially to train a policy for a reinforcement learning algorithm and subsequently employ the reinforcement learning algorithm.

The agent may employ many different types of model based machine learning algorithms. In an example embodiment, the agent 340 implements a linear quadratic regulator (LQR) extension, for example a linear quadratic tracker, in combination with neural network dynamics to model linear dynamics assumption. The settings of a regulating agent governing either a machine or process may be found using a mathematical LQR algorithm that minimizes a cost function defined as a sum of the deviations of key measurements, for example the measurements recorded by the sensors described above with reference to FIG. 3B. The LQR algorithm, identifies such agent settings or conditions that minimize these undesired deviations and may also determine a magnitude of the control action. Accordingly, implementing an LQR algorithm allows the agent to identify an appropriate state-feedback controller. A LQR algorithm is shown in procedural form in FIG. 5F.

In another embodiment, the agent implements a trained long short-term memory (LSTM) model interleaved with proximal policy optimization (PPO). Long short-term memory networks can take into account the temporal nature of the data described above by using an LSTM cell(s) that processes each time step of an input data array sequentially. The LSTM cell itself contains a number of hidden layers or "gates" that interact in various ways to produce two intermediate output vectors: a hidden state and a cell state. These two intermediate output vectors, designed to persist latent information that is relevant to producing a final agent controls, are inputted back into the cell along with the next time step of input data. After the last time step of input data, the final hidden state of the cell is then output to the remainder of the LSTM network, consisting of one or more layers that produce a final risk score as output. FIG. 5G illustrates an example interface for an LSTM-implemented model.

In another embodiment, the agent implements a model trained using Gaussian Process dynamics. A model that involves a Gaussian process predicts the values for an unseen point from a training dataset. However, the prediction is not just an estimate for that point, but also has uncertainty information. Accordingly, it is a one-dimensional Gaussian distribution. A Gaussian process can be used as a prior probability distribution over functions in Bayesian inference. Given any set of N points in the desired domain of the model's function, the agent takes a multivariate Gaussian distribution who covariance matrix parameter is the Gram matrix of your N points with some desired kernel and sample from that Gaussian. In addition to those described above, the agent may implement model predictive control techniques with analytical dynamics or any other model-based machine learning techniques.

VII.I Additional Information

Further description of various elements of reinforcement learning can be found in the publications, "Playing Atari with Deep Reinforcement Learning" by Mnih et. al., "Continuous Control with Deep Reinforcement Learning" by Lillicrap et. al., and "Asynchronous Methods for Deep Reinforcement Learning" by Mnih et. al, all of which are incorporated by reference herein in their entirety.

VIII. Neural Networks and Reinforcement Learning

The model 342 described in Section V and Section VI can also be implemented using an artificial neural network (ANN). That is, the agent 340 executes a model 342 that is an ANN. The model 342 including an ANN determines output action vectors (machine commands) for the machine 100 using input state vectors (measurements). The ANN has been trained such that determined actions from elements of the output action vectors increase the performance of the machine 100.

Figure 6:
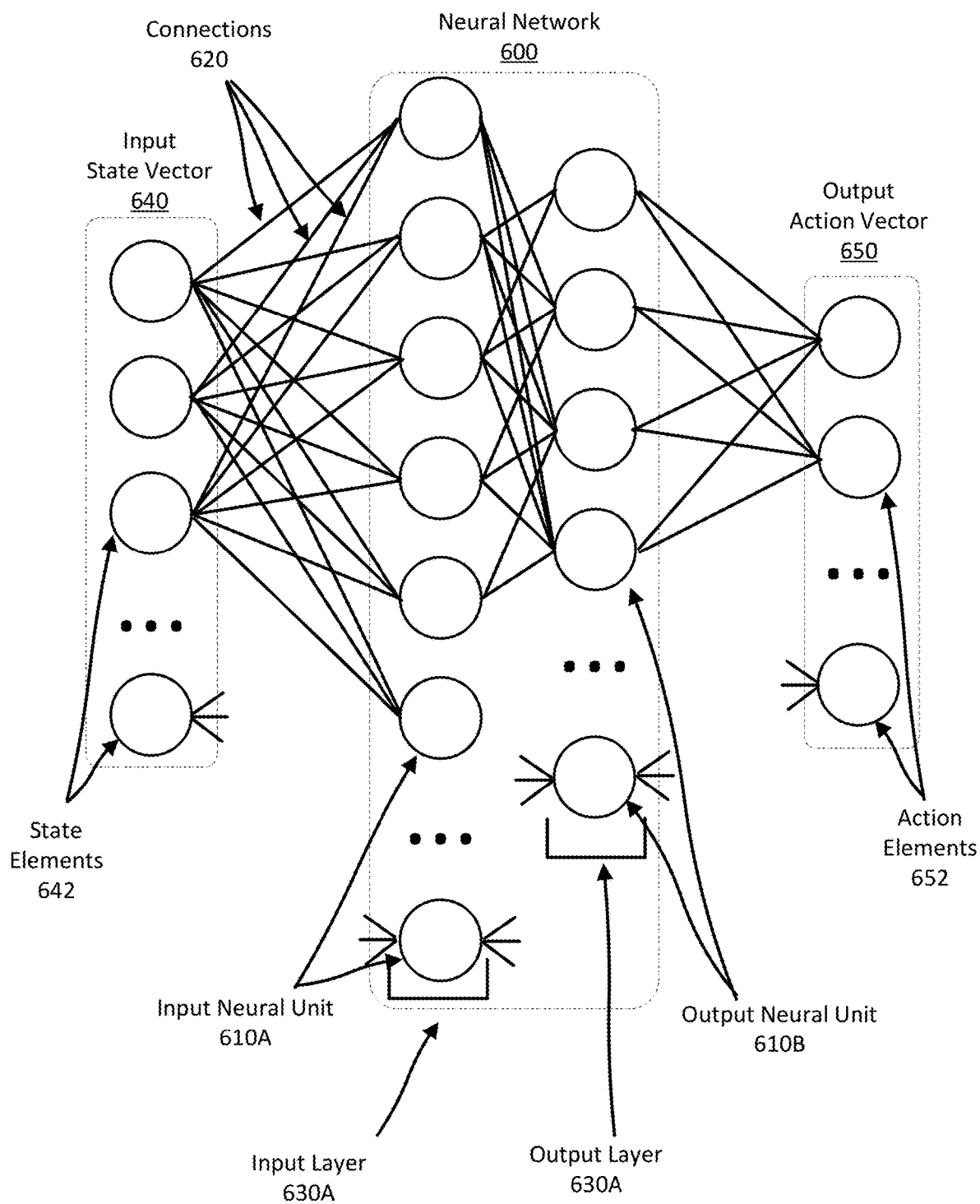
FIG. 6 is an illustration of an artificial neural network that can be used to generate actions that manipulates plant and improves machine performance, according to one example embodiment.

FIG. 6 is an illustration of an ANN 600 of the model 342, according to one example embodiment. The ANN 600 is based on a large collection of simple neural units 610. A neural unit 610 can be an action a, a state s, or any function relating actions a and states s for the machine 100. Each neural unit 610 is connected with many others, and connections 620 can enhance or inhibit adjoining neural units. Each individual neural unit 610 can compute using a summation function based on all of the incoming connections 620. There may be a threshold function or limiting function on each connection 620 and on each neural unit itself 610, such that the neural units signal must surpass the limit before propagating to other neurons. These systems are self-learning and trained (using methods descried in Section VI), rather than explicitly programmed. Here, the goal of the ANN is to improve machine 100 performance by providing outputs to carry out actions to interact with an environment, learning from those actions, and using the information learned to influence actions towards a future goal. In one embodiment, the learning process to train the ANN is similar to policies and policy iteration described above. For example, in one embodiment, a machine 100 takes a first pass through a field to treat a crop. Based on measurements of the machine state, the agent 340 determines a reward which is used to train the agent 340. Each pass through the field the agent 340 continually trains itself using a policy iteration reinforcement learning model to improve machine performance.

The neural network of FIG. 6 includes two layers 630: an input layer 630A and an output layer 630B. The input layer 630A has input neural units 610A which send data via connections 620 to the output neural units 610B of the output layer 630B. In other configurations, an ANN can include additional hidden layers between the input layer 630A and the output layer 630B. The hidden layers can have neural units 610 connected to the input layer 610A, the output layer 610B, or other hidden layers depending on the configuration of the ANN. Each layer can have any number of neural units 610 and can be connected to any number of neural units 610 in an adjacent layer 630. The connections 620 between neural layers can represent and store parameters, herein referred to as weights, that affect the selection and propagation of data from a particular layer's neural units 610 to an adjacent layer's neural units 610. Reinforcement learning trains the various connections 620 and weights such that the output of the ANN 600 generated from the input to the ANN 600 improves machine 100 performance. Finally, each neural unit 610 can be governed by an activation function that converts a neural unit's weighted input to its output activation (i.e., activating a neural unit in a given layer). Some example activation functions that can be used are: the softmax, identify, binary step, logistic, tanH, Arc Tan, softsign, rectified linear unit, parametric rectified linear, bent identity, sing, Gaussian, or any other activation function for neural networks.

Mathematically, an ANN's function (F(s), as introduced above) is defined as a composition of other sub-functions $g_i(x)$, which can further be defined as a composition of other sub-sub-functions. The ANN's function is a representation of the structure of interconnecting neural units and that function can work to increase agent performance in the environment. The function, generally, can provide a smooth transition for the agent towards improved performance as input state vectors change and the agent takes actions.

Most generally, the ANN 600 can use the input neural units 610A and generate an output via the output neural units 610B. In some configurations, input neural units 610A of the input layer can be connected to an input state vector 640 (e.g., s). The input state vector 640 can include any information regarding current or previous states, actions, and rewards of the agent in the environment (state elements 642). Each state element 642 of the input state vector 640 can be connected to any number of input neural units 610A. The input state vector 640 can be connected to the input neural units 610A such that ANN 600 can generate an output at the output neural units 610B in the output layer 630A. The output neural units 610B can represent and influence the actions taken by the agent 340 executing the model 442. In some configurations, the output neural units 610B can be connected to any number of action elements 652 of an output action vector (e.g., a). Each action element can represent an action the agent can take to improve machine 100 performance. In another configuration, the output neural units 610B themselves are elements of an output action vector.

VIII.A Agent Training Using Two ANNs

In one embodiment, similar to FIG. 5E, the agent 340 can execute a model 342 using an ANN trained using an actor-critic training method (as described in Section VI). The actor and critic are two similarly configured ANNs in that the input neural units, output neural units, input layers, output layers, and connections are similar when the ANNs are initialized. At each iteration of training, the actor ANN receives as input an input state vector and, together with the weight functions (for example, γ as described above) that make up the actor ANN (as they exist at that time step), outputs an output action vector. The weight functions define the weights for the connections connecting the neural units of the ANN. The agent takes an action in the environment that can affect the state and the agent measures the state. The critic ANN receives as input an input state vector and a reward state vector and, together with the weight functions that make up the critic ANN, outputs weight functions to be provided to the actor ANN. The reward state vector is used to modify the weighted connections in the critic ANN such that the outputted weights functions for the actor ANN improve machine performance. This process continues for every time step, with the critic ANN receiving rewards and states as input and providing weights to the actor ANN as outputs, and the actor ANN receiving weights and rewards as inputs and providing an action for the agent as output.

The actor-critic pair of ANNs work in conjunction to determine a policy that generates output action vectors representing actions that improve boom sprayer performance from input state vectors measured from the environment. After training, the actor-critic pair is said to have determined a policy, the critic ANN is discarded and the actor ANN is used as the model 342 for the agent 340.

In this example the reward data vector can include elements with each element representing a measure of a performance metric of the boom sprayer after executing an action. The performance metric may be represented by any of: (i) a distance between the boom sprayer assembly 212 and the plant, (ii) a metric quantifying the average, variance, standard deviation, etc. of the distance between the boom sprayer assembly and the plant over time, (iii) a distance between the boom sprayer assembly and the ground, (iv) a metric quantifying the average, variance, max deviation, standard deviation, etc. of the distance between the boom sprayer assembly and the ground over time, (v) a measure of amount of plant treated, and (vi) a quality of a treatment applied to the plant. The performance metrics can be determined from any of the measurements received from the sensors 330. Each element of the reward data vector is associated with a weight defining a priority for each performance metric such that certain performance metrics can be prioritized over other performance metrics. In one embodiment, the reward vector is a linear combination of the different metrics. In some examples, the operator of the boom sprayer can determine the weights for each performance metric by interacting with the interface 350 of the control system. For example, the operator can input the height of the boom assembly is prioritized relative to an amount of plants treated. The critic ANN determines a weight function including a number of modified weights for the connections in the actor ANN based on the input state vector and the reward data vector.

Training the ANN can be accomplished using real data obtained from machines operating in a plant field. Thus, in one configuration, the ANNs of the actor-critic method can be trained using a set of input state vectors from any number of boom sprayers taking any number of actions based on an output action vectors when treating plants in the field. The input state vectors and output action vectors can be accessed from memory of the control systems 130 of various boom sprayers.

However, training ANNs can require a large amount of data that is challenging to cheaply obtain from machines operating in a field. Thus, in another configuration, the ANNs of the actor-critic method can be trained using a set of simulated input state vectors and simulated output action vectors. The simulated vectors can be generated from a set of seed input state vectors and seed output action vectors obtained from boom sprayers treating plants. In this example, in some configurations, the simulated input state vectors and simulated output action vectors can originate from an ANN configured to generate actions that improve machine performance.

IX Agent for A Boom Sprayer

Figure 7:
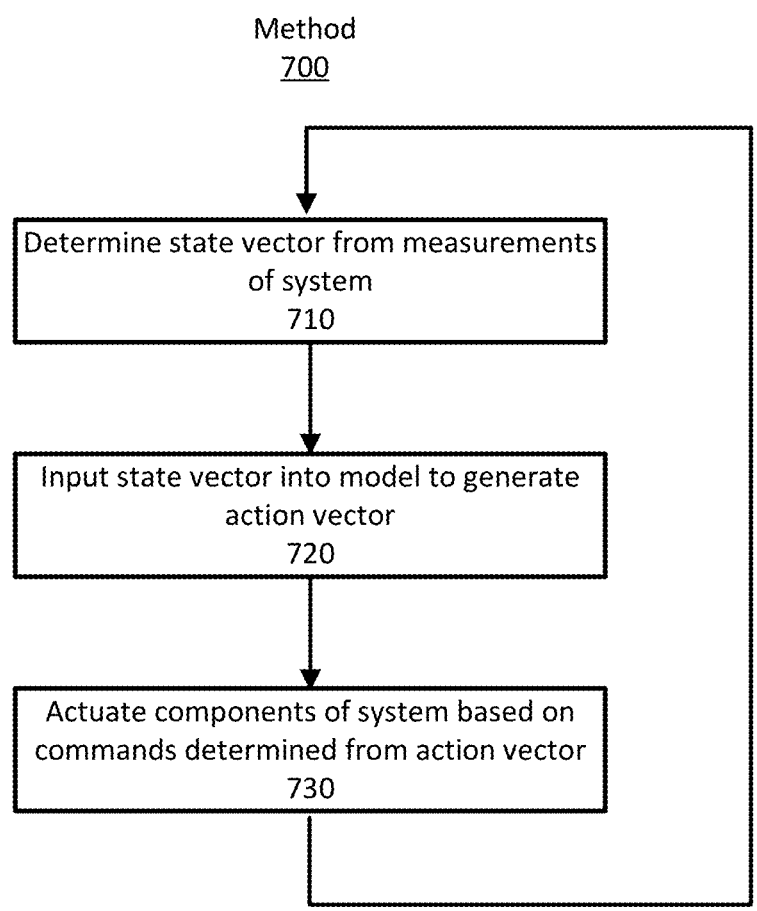
FIG. 7 is a flow diagram illustrating a method for generating actions that improve boom sprayer performance using an agent executing a model including an artificial neural net trained using an actor-critic method, according to one example embodiment.

This section describes an agent 340 executing a model 342 for improving the performance of a boom sprayer 200. In this example, model 342 is a reinforcement learning model implemented using an artificial neural net similar to the ANN of FIG. 6. That is, the ANN includes an input layer including a number of input neural units and an output layer including a number of output neural units. Each input neural unit is connected to any number of the output neural units by any number of weighted connections. The agent 340 inputs measurements of the boom sprayer 200 to the input neural units and the model outputs actions for the boom sprayer 200 to the output neural units. The agent 340 determines a set of machine commands based on the output neural units representing actions for the boom sprayer that improves boom sprayer performance. FIG. 7 is a method 700 for generating actions that improve boom sprayer performance using an agent executing 340 a model 342 including an artificial neural net trained using an actor-critic method. FIG. 7 may also represent a method 700 for generating actions that improve performance using an agent executing a model 342 including some combination of model based methods as described above in the section titled "Other Model-Based Machine Learning Techniques." Method 700 can include any number of additional or fewer steps, or the steps may be accomplished in a different order.

First, the agent determines 710 an input state vector for the model 342. The elements of the input state vector can be determined from any number of measurements received from the sensors 330 via the network 310. Each measurement is a measure of a state of the machine 100.

Next, the agent inputs 720 the input state vector into the model 342. Each element of the input vector is connected to any number of the input neural units. The model 342 represents a function configured to generate actions to improve the performance of the boom sprayer 200 from the input state vector. Accordingly, the model 342 generates an output in the output neural units predicted to improve the performance of the boom sprayer. In one example embodiment, the output neural units are connected to the elements of an output action vector and each output neural unit can be connected to any element of the output action vector. Each element of the output action vector is an action executable by a component 120 of the boom sprayer 200. In some examples, the agent 340 determines a set of machine commands for the components 120 based on the elements of the output action vector.

Next, the agent 340 sends the machine commands to the input controllers 330 for their components 120 and the input controllers 330 actuate 730 the components 120 based on the machine commands in response. Actuating 730 the components 120 executes the action determined by the model 342. Further, actuating 730 the components 120 changes the state of the environment and sensors 330 measure the change of the state.

The agent 340 again determines 710 an input state vector to input 720 into the model and determine an output action and associated machine commands that actuate 730 components of the boom sprayer as the boom sprayer travels through the field and treats plants. Over time, the agent 340 works to increase the performance of the boom sprayer 200 when treating plants.

Table 1 describes various states that can be included in an input data vector. Table 1 also includes each states associated measurement m, the sensor(s) 330 that generate the measurement m, and a description of the measurement. The input data vector can additionally or alternatively include any other states determined from measurements generated from sensors of the boom sprayer 200. For example, in some configurations, the input state vector can include previously determined states from previous measurements m. In this case, the previously determined states (or measurements) can be stored in memory systems of the control system 130. In another example, the input state vector can include changes between the current state and a previous state.

TABLE 1

States included in an input vector.

| State (s) | Meas. (m) | Sensor | Description |
|---|---|---|---|
| Frame Height | d | Ultrasonic 356 Laser Height 386 | Height of a boom sprayer relative to the ground |
| Frame Angle | ° | Tilt 358 | Angle of a boom sprayer frame relative to the direction of gravity |
| Roll Angle | V | Roll Angle 360 | Measure of boom sprayer's roll angle |
| Sprayer Position | °N, °E | GPS 362 | Position of the boom sprayer in a coordinate system |
| Suspension Height | d | Suspension 370 | Distance between boom sprayer's suspension and the ground |
| Sprayer Motion | G's (gravity) | IMU 372 | Motion sensing information characterizing the boom sprayer |
| Speed | mph | Wheel Speed 364 | Speed information describing speed of the boom sprayer |
| Steering Angle | ° | Steering Angle 366 | Directional information describing orientation of boom sprayer |
| Canopy Height | d | Canopy Height 388 | Height of a boom sprayer relative to a plant canopy |
| Compass Bearing | ° | Compass 390 | Compass bearing of boom sprayer |

Table 2 describes various actions that can be included in an output action vector. Table 2 also includes the machine controller that receives machine commands based on the actions included output action vector, a high-level description of how each input controller 320 actuates their respective components 120, and the units of the actuation change.

TABLE 2

Action included in an output vector.

| Action (a) | Controller | Description | Units |
|---|---|---|---|
| Current to Left Frame Solenoids | Left Frame 380 | Adjust position of the left frame relative to the ground or the center frame | d, ° |
| Current to Center Frame Solenoids | Fixed Center Frame 382 | Adjust position of the floating center frame relative to the ground or the fixed center frame | d, ° |
| Current to Right Frame Solenoids | Right Frame 384 | Adjust position of the right frame relative to the ground or the center frame | d, ° |

In one example, the agent 340 is executing a model 442 that is not actively being trained using the reinforcement techniques described in Section VI. In this case, the agent can be a model that was independently trained using the actor critic methods described in Section VII.A. That is, the agent is not actively rewarding connections in the neural network. The agent can also include various models that have been trained to optimize different performance metrics of the boom sprayer. The user of the boom sprayer can select between performance metrics to optimize, and thereby change the models, using the interface of the control system 130.

In other examples, the agent can be actively training the model 442 using reinforcement techniques. In this case, the model 342 generates a reward vector including a weight function that modifies the weights of any of the connections included in the model 342. The reward vector can be configured to reward various metrics including the performance of the boom sprayer as a whole, reward a state, reward a change in state, etc. In some examples, the user of the boom sprayer can select which metrics to reward using the interface of the control system 130.

X. Control System

Figure 8:
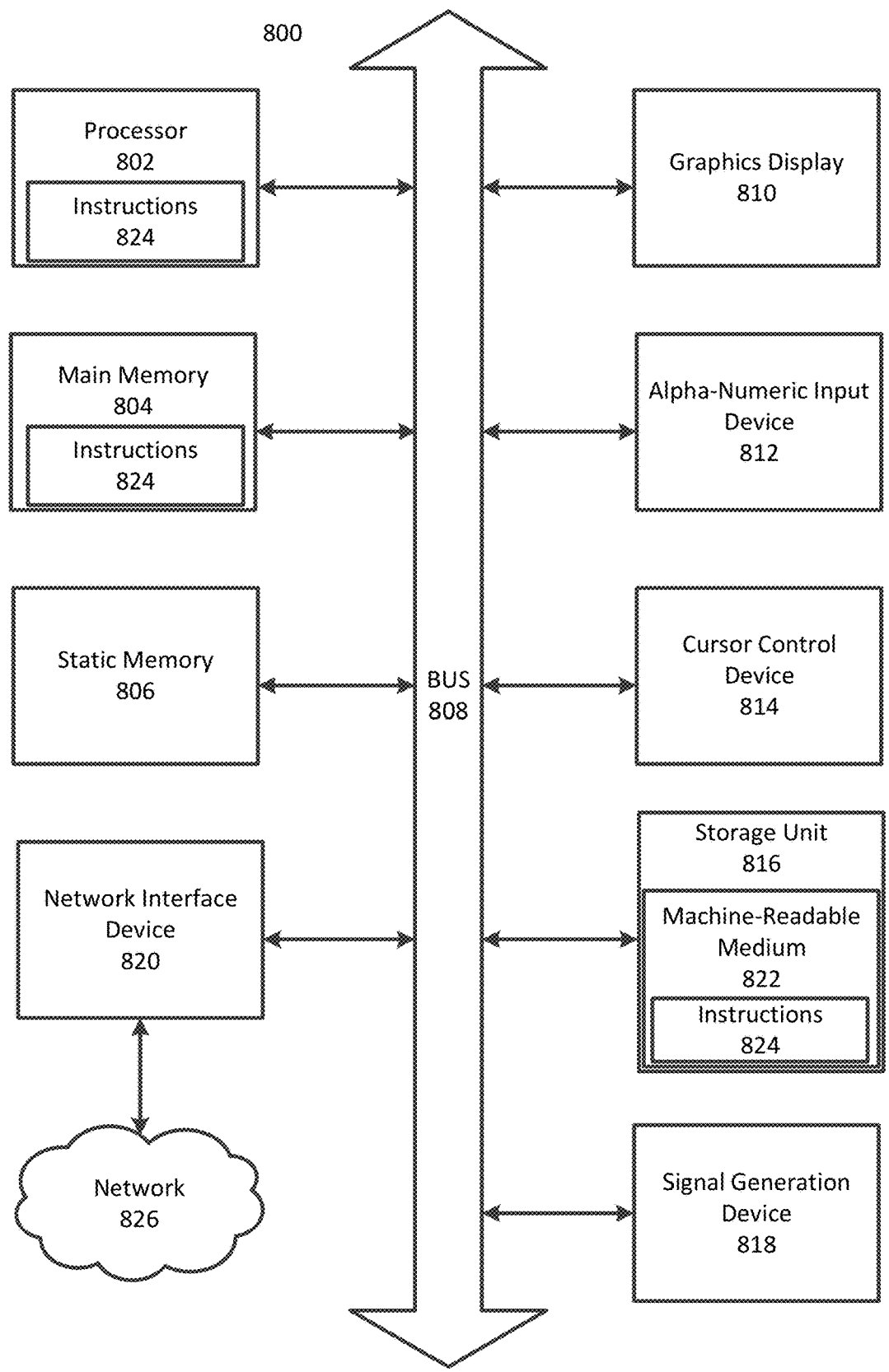
FIG. 8 is an illustration of a computer that can be used to control the machine for manipulating plants in the field, according to one example embodiment.

FIG. 8 is a block diagram illustrating components of an example machine for reading and executing instructions from a machine-readable medium. Specifically, FIG. 8 shows a diagrammatic representation of network system 300 and control system 310 in the example form of a computer system 800. The computer system 800 can be used to execute instructions 824 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 824 (sequential or otherwise) that specify actions to be taken by that machine. Further, while only a single machine is illustrated, the term "machine" shall also be taken to include any collection of machines that individually or jointly execute instructions 824 to perform any one or more of the methodologies discussed herein.

The example computer system 800 includes one or more processing units (generally processor 802). The processor 802 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 800 also includes a main memory 804. The computer system may include a storage unit 816. The processor 802, memory 804, and the storage unit 816 communicate via a bus 808.

In addition, the computer system 806 can include a static memory 806, a graphics display 810 (e.g., to drive a plasma display panel (PDP), a liquid crystal display (LCD), or a projector). The computer system 800 may also include alphanumeric input device 812 (e.g., a keyboard), a cursor control device 814 (e.g., a mouse, a trackball, a joystick, a motion sensor, or other pointing instrument), a signal generation device 818 (e.g., a speaker), and a network interface device 820, which also are configured to communicate via the bus 808.

The storage unit 816 includes a machine-readable medium 822 on which is stored instructions 824 (e.g., software) embodying any one or more of the methodologies or functions described herein. For example, the instructions 824 may include the functionalities of modules of the system 130 described in FIG. 2. The instructions 824 may also reside, completely or at least partially, within the main memory 804 or within the processor 802 (e.g., within a processor's cache memory) during execution thereof by the computer system 800, the main memory 804 and the processor 802 also constituting machine-readable media. The instructions 824 may be transmitted or received over a network 826 via the network interface device 820.

XI. Additional Considerations

In the description above, for purposes of explanation, numerous specific details are set forth in order to provide a thorough understanding of the illustrated system and its operations. It will be apparent, however, to one skilled in the art that the system can be operated without these specific details. In other instances, structures and devices are shown in block diagram form in order to avoid obscuring the system.

Reference in the specification to "one embodiment" or "an embodiment" means that a particular feature, structure, or characteristic described in connection with the embodiment is included in at least one embodiment of the system. The appearances of the phrase "in one embodiment" in various places in the specification are not necessarily all referring to the same embodiment.

Some portions of the detailed descriptions are presented in terms of algorithms or models and symbolic representations of operations on data bits within a computer memory. An algorithm is here, and generally, conceived to be steps leading to a desired result. The steps are those requiring physical transformations or manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some of the operations described herein are performed by a computer physically mounted within a machine 100. This computer may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of non-transitory computer readable storage medium suitable for storing electronic instructions.

The figures and the description above relate to various embodiments by way of illustration only. It should be noted that from the following discussion, alternative embodiments of the structures and methods disclosed herein will be readily recognized as viable alternatives that may be employed without departing from the principles of what is claimed.

One or more embodiments have been described above, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct physical or electrical contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article or apparatus that comprises a list of elements is not necessarily limited to only those elements but may include other elements not expressly listed or inherent to such process, method, article or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B is true (or present).

In addition, use of the "a" or "an" are employed to describe elements and components of the embodiments herein. This is done merely for convenience and to give a general sense of the system. This description should be read to include one or at least one and the singular also includes the plural unless it is obvious that it is meant otherwise.

Upon reading this disclosure, those of skill in the art will appreciate still additional alternative structural and functional designs for a system and a process for detecting potential malware using behavioral scanning analysis through the disclosed principles herein. Thus, while particular embodiments and applications have been illustrated and described, it is to be understood that the disclosed embodiments are not limited to the precise construction and components disclosed herein. Various modifications, changes and variations, which will be apparent to those, skilled in the art, may be made in the arrangement, operation and details of the method and apparatus disclosed herein without departing from the spirit and scope defined in the appended claims.

What is claimed is:

1. A method for controlling a plurality of actuation controllers of a plurality of components of a boom sprayer to treat plants as the boom sprayer travels through a plant field, the method comprising:
   determining a state vector comprising a plurality of state elements, each of the state elements representing a measurement of a state of a subset of the plurality of components of the boom sprayer, and each of the plurality of components controlled by an actuation controller communicatively coupled to a computer mounted on the boom sprayer;
   inputting, using the computer, the state vector into a control model to generate an action vector comprising a plurality of action elements for the boom sprayer, each of the action elements specifying an action to be taken by the boom sprayer in the plant field, and the actions, in aggregate, predicted to optimize one or more performance metrics of the boom sprayer; and
   actuating a subset of the plurality of actuation controllers to execute the actions in the plant field based on the action vector, the subset of actuation controllers changing a configuration of the subset of components such that the state of the boom sprayer changes, and wherein actuating the subset of actuation controllers comprises:
      determining a set of machine instructions in each actuation controller of the subset such that the machine instructions change the configuration of each component when received by the actuation controller,
      accessing a data network communicatively coupling the actuation controllers, and
      sending the set of machine instructions to each actuation controller of the subset via the data network.

2. The method of claim 1, wherein the control model comprises a function representing a relationship between the state vector received as an input to the control model and the action vector generated as an output to the control model, and the function is a model trained using reinforcement learning to reward actions that improve treatments applied to a plant in the plant field by the boom sprayer.

3. The method of claim 1 wherein the control model comprises an artificial neural network comprising:
   a plurality of neural nodes including a set of input nodes for receiving an input to the artificial neural network and a set of output nodes for outputting an output to the artificial neural network, where
      each neural node represents a sub-function for determining an output for the artificial neural network from the input of the artificial neural network, and
      each input node is connected to one or more output nodes by a connection of a plurality of weighted connections; and
   a function configured to generate actions for the boom sprayer which improve the boom sprayer performance, the function defined by a plurality of sub-functions and weighted connections of the artificial neural network.

4. The method of claim 3, wherein:
   each state element of the state vector is connected to one or more input nodes by a connection of the plurality of weighted connections,
   each action element of the action vector is connected to one or more output nodes by a connection of the plurality of weighted connections, and
   the function is configured to generate action elements of the action vector from state elements of the state vector.

5. The method of claim 3, wherein the artificial neural network is a first artificial neural network from a pair of similarly configured artificial neural networks acting as an actor-critic pair and used to train the first artificial neural network to generate actions that improve the boom sprayer performance.

6. The method of claim 5, wherein:
   the first artificial neural network inputs state vectors and values for the weighted connections and outputs action vectors, the values for the weighted connections modifying the function for generating actions for the boom sprayer that improve boom sprayer performance, and
   a second neural network inputting a reward vector and a state vector and outputting the values for the weighted connections, the reward vector comprising elements signifying improvement in performance of the boom sprayer from a previously executed action that improves boom sprayer performance.

7. The method of claim 6 wherein the elements of the reward vector are determined using at least one measurement quantifying capabilities of a subset the components of the boom sprayer that were previously actuated based on the previously executed action.

8. The method of claim 5, wherein an operator of the boom sprayer can select one or more metrics for performance improvement, the metrics including any of a distance between the boom sprayer and a plant in the plant field, a distance between the boom sprayer and the plant, a distance between the boom sprayer and a ground surface, a distance between the boom sprayer and the ground surface over time, an amount of plant treated, and a quality of treatment applied to plant.

9. The method of claim 5, wherein the state vector is obtained from plurality of boom sprayers taking a plurality of actions from a plurality of action vectors to treat plants in the plant field.

10. The method of claim 5, wherein the state vectors and action vectors are simulated from a set of state vectors obtained from a plurality of boom sprayers taking a set of actions from a seed set of action vectors to treat plants in the plant field.

11. The method of claim 1, wherein determining the state vector comprises:
   accessing a data network communicatively coupling a plurality of sensors, each sensor for providing a measurement quantifying capabilities of a subset of the components of the boom sprayer; and
   determining elements of the state vector based on the measurements included in the data network.

12. The method of claim 11, wherein the plurality of sensors can include any of an ultrasonic sensor, tilt sensor, roll angle sensor, GPS sensor, vehicle wheel speed sensor, steering angle sensor, tread width sensors, suspension sensors, and an IMU sensors.

13. The method of claim 1, wherein the plurality of state elements comprise any of:
   a frame height representing a height of the boom sprayer relative to a ground of the plant field;
   a frame angle representing an angle of the boom sprayer frame relative to a direction of gravity;
   a sprayer potential representing a measure of an electric potential of the boom sprayer;
   a sprayer position representing a position of the boom sprayer in a coordinate system;
   a suspension height representing a distance between the suspension of the boom sprayer and the ground; and
   a sprayer motion representing a set of motion sensing information characterizing the boom sprayer.

14. The method of claim 1, wherein the action elements can specify actions including any of:
   adjusting a position of a left frame relative to a ground of the plant field or a center frame of the boom sprayer;
   adjusting a position of the center frame of the boom sprayer relative to the ground or a fixed center frame of the boom sprayer; and
   adjusting a position of a right frame of the boom sprayer relative to the ground or the center frame.

15. The method of claim 1, wherein the plurality of components of the boom sprayer can include any of a fixed or floating center frame, a center boom frame, a left boom, and a right boom, wherein the fixed or floating center frame supports a spray boom assembly comprising a plurality of spray nozzles for applying treatment to a plant in the plant field.

16. The method of claim 1, wherein the components of the boom sprayer are configured to treat plants including any of corn, wheat, or rice.

17. The method of claim 1, wherein action elements of the action vector are a numerical representation of the action.

18. The method of claim 1, wherein state elements of the state vector are a numerical representation of measurements making up the state vector.

19. The method of claim 1, wherein the control model comprises a reinforcement learning model, where the reinforcement learning model implements one or more of the following:
   an action-value function;
   a state-value function;
   policy iteration;
   value iteration;
   temporal-difference learning;
   Q-learning;
   Value prediction; and
   Actor-critic training.

20. The method of claim 1, wherein the control model implements one of the following:
   A linear quadratic (LQR) extension; and
   A long short-term memory (LSTM) model interleaved with a proximal policy optimization (PPO).

21. The method of claim 1, wherein the control model is trained using Gaussian Process dynamics.

22. A non-transitory computer readable storage medium storing instructions for controlling a plurality of actuation controllers of a plurality of components of a boom sprayer to treat plants encoded thereon that, when executed by one or more processors, cause the one or more processors to perform the steps including:
   determining a state vector comprising a plurality of state elements, each of the state elements representing a measurement of a state of a subset of the plurality of components of the boom sprayer, and each of the plurality of components controlled by an actuation controller communicatively coupled to a computer mounted on the boom sprayer;
   inputting, using the computer, the state vector into a control model to generate an action vector comprising a plurality of action elements for the boom sprayer, each of the action elements specifying an action to be taken by the boom sprayer in the plant field, and the actions, in aggregate, predicted to optimize one or more performance metrics of the boom sprayer; and
   actuating a subset of the plurality of actuation controllers to execute the actions in the plant field based on the action vector, the subset of actuation controllers changing a configuration of the subset of components such that the state of the boom sprayer changes, and wherein actuating the subset of actuation controllers comprises:
      determining a set of machine instructions in each actuation controller of the subset such that the machine instructions change the configuration of each component when received by the actuation controller,
      accessing a data network communicatively coupling the actuation controllers; and
      sending the set of machine instructions to each actuation controller of the subset via the data network.

23. A boom sprayer comprising:
   one or more spray mechanisms;
   one or more actuation controllers communicatively coupled to the one or more spray mechanisms and for controlling the one or more spray mechanisms;
   one or more computer processors; and
   a computer-readable storage medium storing instructions that when executed causes one or more processors to:
      determine a state vector comprising a plurality of state elements, each of the state elements representing a measurement of a state of a subset of the plurality of components of the boom sprayer, and each of the plurality of components controlled by an actuation controller communicatively coupled to a computer mounted on the boom sprayer;
      input, using the one or more computer processors, the state vector into a control model to generate an action vector comprising a plurality of action elements for the boom sprayer, each of the action elements specifying an action to be taken by the boom sprayer in the plant field, and the actions, in aggregate, predicted to optimize one or more performance metrics of the boom sprayer; and
      actuate a subset of the plurality of actuation controllers to execute the actions in the plant field based on the action vector, the subset of actuation controllers changing a configuration of the subset of components such that the state of the boom sprayer changes, and wherein actuating the subset of actuation controllers comprises:
         determining a set of machine instructions in each actuation controller of the subset such that the machine instructions change the configuration of each component when received by the actuation controller,
         accessing a data network communicatively coupling the actuation controllers; and
         sending the set of machine instructions to each actuation controller of the subset via the data network.

* * * * *